United States Patent
Park et al.

(10) Patent No.: US 11,095,342 B2
(45) Date of Patent: Aug. 17, 2021

(54) METHOD FOR TRANSMITTING AND RECEIVING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/765,710

(22) PCT Filed: Oct. 4, 2016

(86) PCT No.: PCT/KR2016/011053
§ 371 (c)(1),
(2) Date: Apr. 3, 2018

(87) PCT Pub. No.: WO2017/061744
PCT Pub. Date: Apr. 13, 2017

(65) Prior Publication Data
US 2019/0097693 A1    Mar. 28, 2019

Related U.S. Application Data

(60) Provisional application No. 62/236,973, filed on Oct. 4, 2015.

(51) Int. Cl.
*H04K 1/10*    (2006.01)
*H04L 27/28*    (2006.01)
(Continued)

(52) U.S. Cl.
CPC ......... *H04B 7/0417* (2013.01); *H04B 7/0469* (2013.01); *H04B 7/0478* (2013.01);
(Continued)

(58) Field of Classification Search
CPC .. H04B 7/0417; H04B 7/0626; H04B 7/0617; H04B 7/0634; H04B 7/0695;
(Continued)

(56) References Cited

U.S. PATENT DOCUMENTS 8,964,671 B2 *   2/2015   Taoka ............... H04L 1/0073
                                                            370/329
9,520,929 B2 *  12/2016   Yamazaki ............ H04W 16/28
(Continued)

FOREIGN PATENT DOCUMENTS

CN    102291201    12/2011
CN    103516464    1/2014
(Continued)

OTHER PUBLICATIONS

PCT International Application No. PCT/KR2016/011053, International Search Report dated Jan. 24, 2017, 2 pages.
(Continued)

*Primary Examiner* — Phuong Phu
(74) *Attorney, Agent, or Firm* — Lee, Hong, Degerman, Kang & Waimey

(57) ABSTRACT

Disclosed are a method for transmitting and receiving channel state information in a wireless communication system and an apparatus therefor. Specifically, a method for transmitting, by a terminal, channel state information (CSI) in a wireless communication system comprises the steps of: receiving a CSI process setting from a base station; and reporting, to the base station, CSI corresponding to a CSI process set by the CSI process setting, wherein when the CSI process is set to a beamformed CSI-reference signal (CSI-
(Continued)

RS) type, and the CSI process is associated with a single CSI-RS resource, a codebook used for deriving the CSI may be indicated by the CSI process setting.

10 Claims, 12 Drawing Sheets

(51) Int. Cl.
  *H04B 7/0417* (2017.01)
  *H04B 7/06* (2006.01)
  *H04L 5/00* (2006.01)
  *H04B 7/0456* (2017.01)
  *H04B 7/08* (2006.01)

(52) U.S. Cl.
  CPC ......... *H04B 7/0617* (2013.01); *H04B 7/0619* (2013.01); *H04B 7/0626* (2013.01); *H04B 7/0634* (2013.01); *H04B 7/0695* (2013.01); *H04B 7/0851* (2013.01); *H04L 5/005* (2013.01); *H04L 5/0023* (2013.01); *H04L 5/0053* (2013.01)

(58) Field of Classification Search
  CPC ... H04B 7/0469; H04B 7/0851; H04L 1/0073; H04W 16/28
  USPC ................................. 375/260, 219, 220, 222
  See application file for complete search history.

(56) References Cited

U.S. PATENT DOCUMENTS

| | | | | |
|---|---|---|---|---|
| 2013/0064129 A1* | 3/2013 | Koivisto | .............. | H04B 7/0621 370/252 |
| 2013/0336214 A1 | 12/2013 | Sayana et al. | | |
| 2014/0078919 A1 | 3/2014 | Hammarwall | | |
| 2015/0055723 A1 | 2/2015 | Kim et al. | | |
| 2016/0233938 A1* | 8/2016 | Mondal | ................ | H04B 17/345 |

FOREIGN PATENT DOCUMENTS

| | | |
|---|---|---|
| CN | 104067533 | 9/2014 |
| CN | 104243003 | 12/2014 |
| WO | 2014123340 | 8/2014 |
| WO | 2015012653 | 1/2015 |

OTHER PUBLICATIONS

Ericsson, "Codebook subset restriction for Class B FD-MIMO", R1-155681, 3GPP TSG-RAN WG1#82bis, Oct. 2015, 1 page.

Ericsson, "CSI measurement restrictions", R1-155674, 3GPP TSG-RAN WG1#82bis, Oct. 2015, 3 pages.

European Patent Office Application Serial No. 16853860.1, Search Report dated Mar. 29, 2019, 12 pages.

Korean Intellectual Property Office Application No. 10-2018-7010013, Office Action dated Oct. 17, 2019, 5 pages.

Samsung, "Schemes for Class B CSI Reporting for Rel. 13", 3GPP TSG RAN WG1 Meeting #82bis, R1-155499, Oct. 2015, 6 pages.

Samsung, "Discussion on measurement restriction for beamformed CSI-RS", 3GPP TSG RAN WG1 Meeting #82, R1-154161, Aug. 2015, 3 pages.

State Intellectual Property Office of the People'Republic of China Application Serial No. 201680066972.8, Office Action dated Sep. 27, 2020, 19 pages.

Ericcson, "CSI Feedback for FD-MIMO," 3GPP TSG-RAN WG1 #82, R1-154550, Aug. 2015, 5 pages.

* cited by examiner

[FIG. 1]
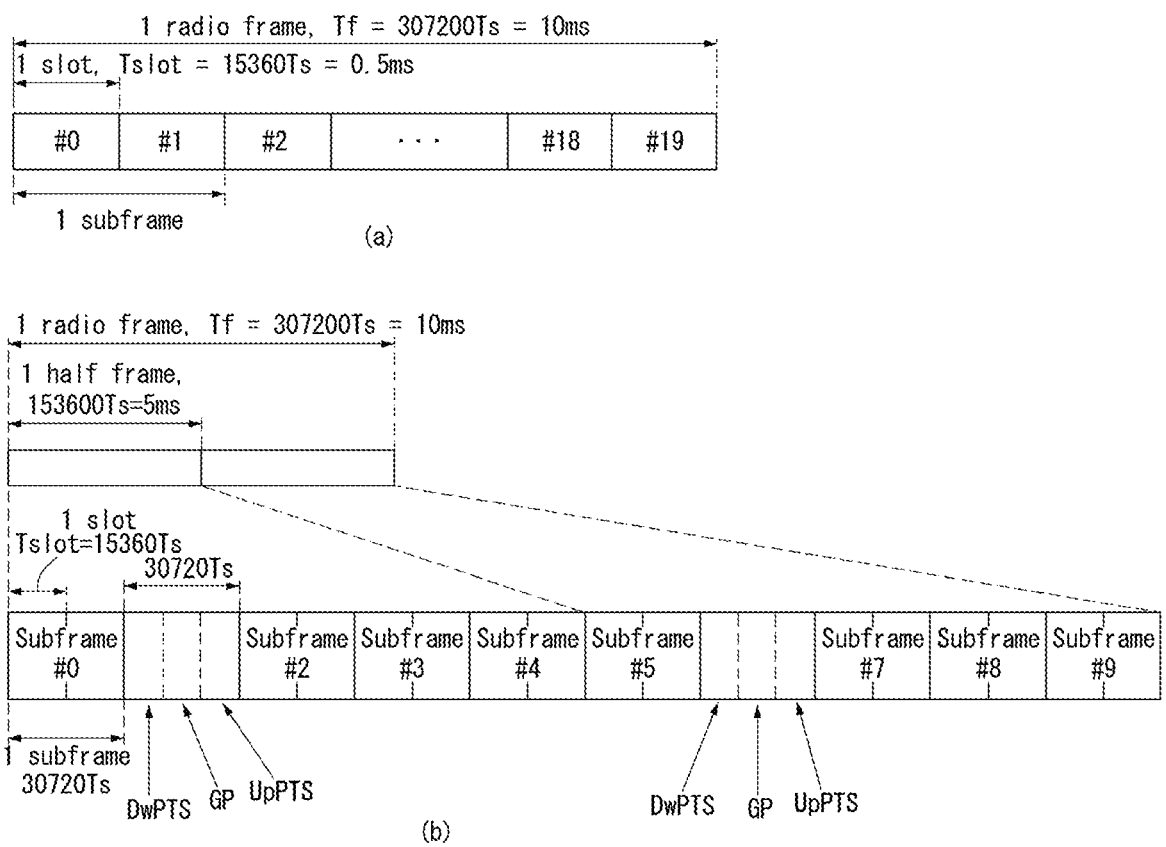

[FIG. 2]
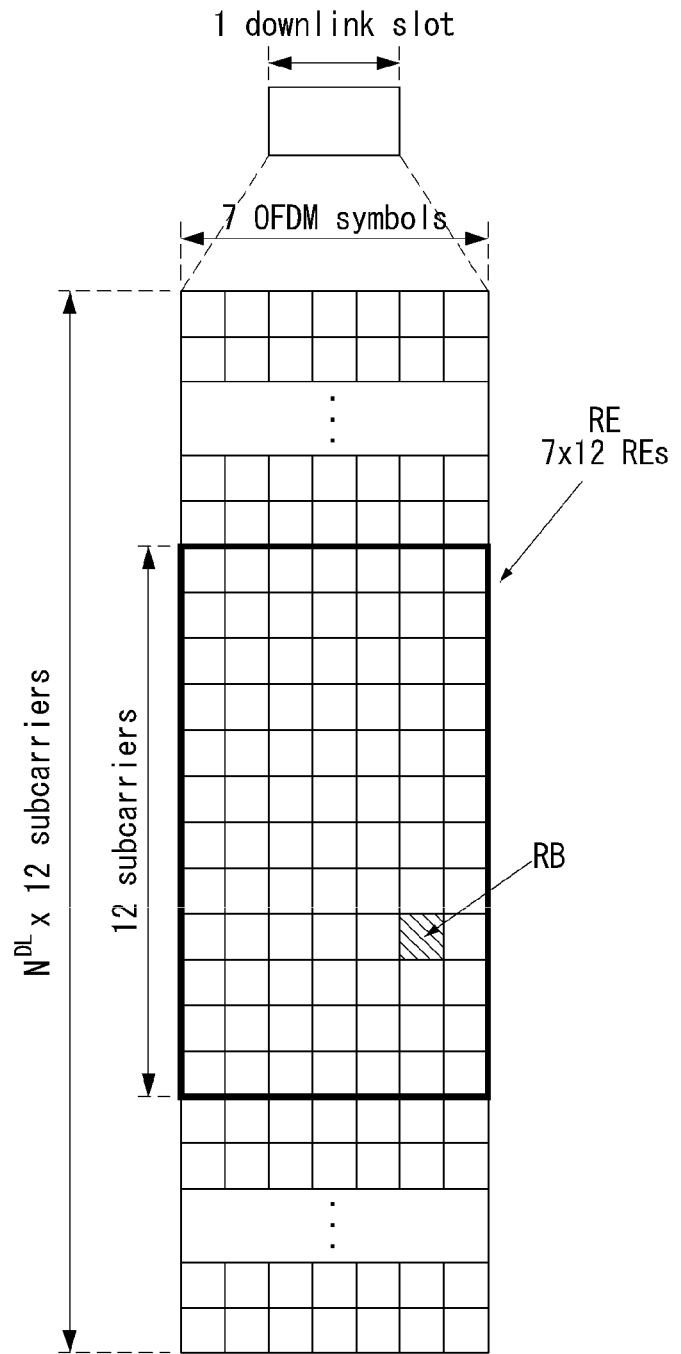

[FIG. 3]
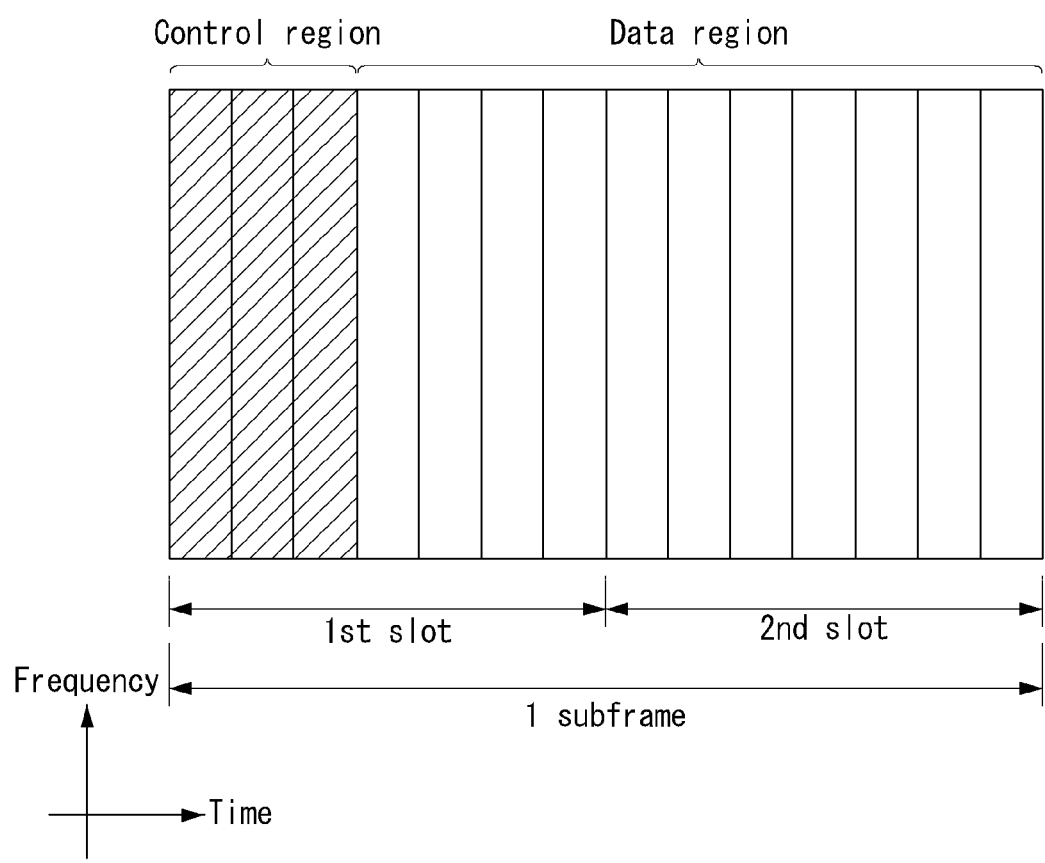

[FIG. 4]
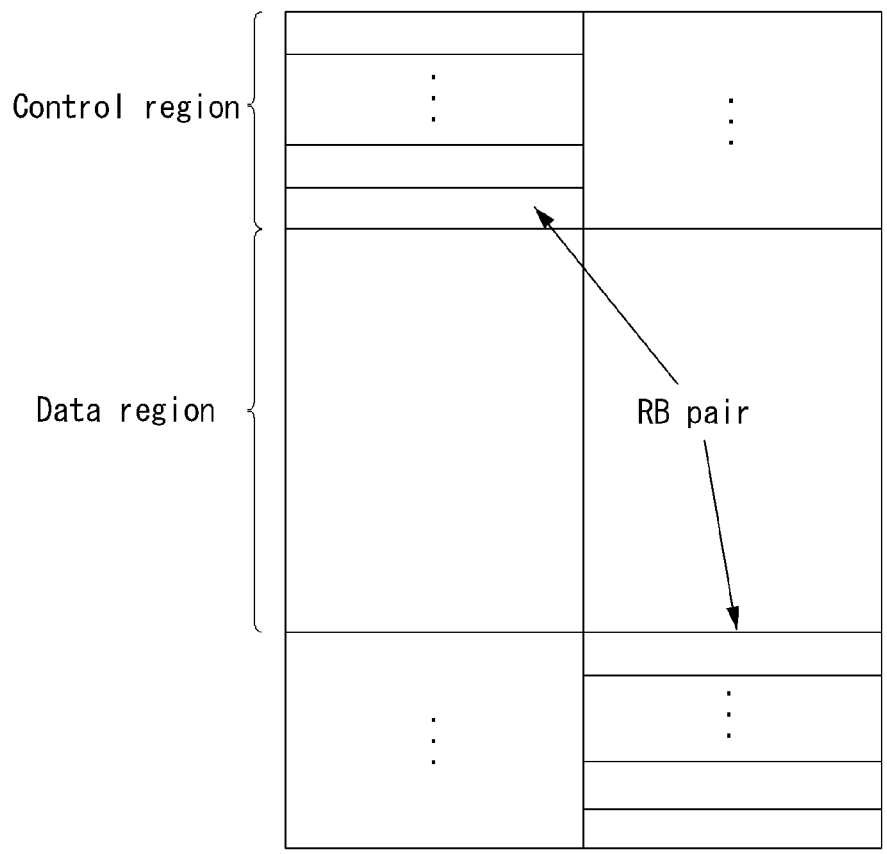

[FIG. 5]
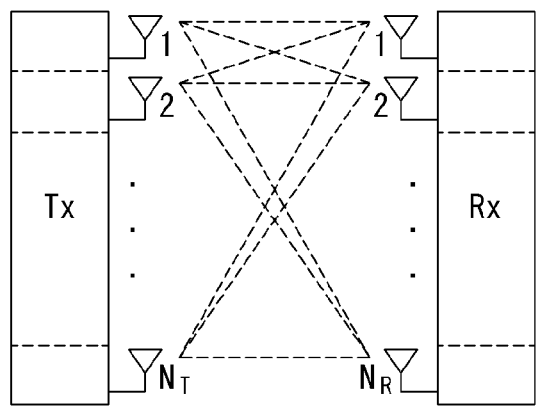
[FIG. 6]
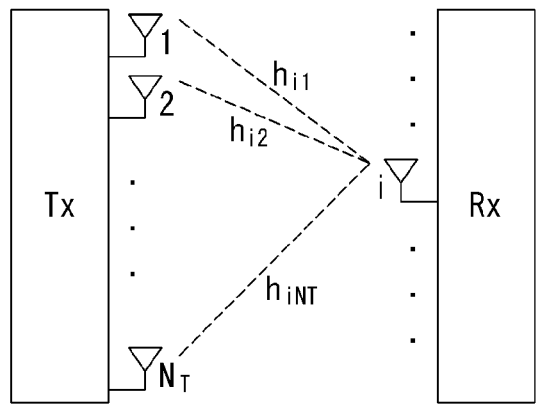

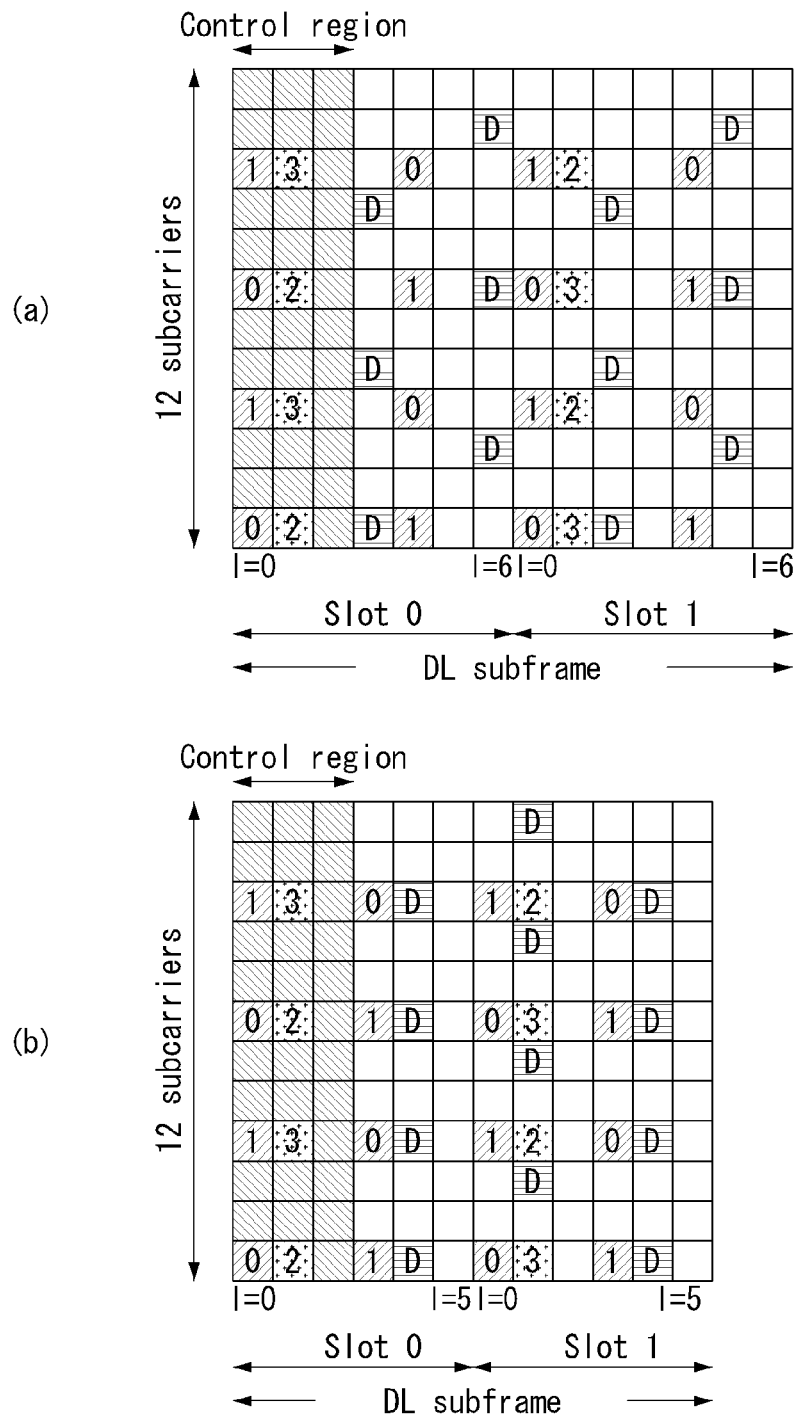
[FIG. 7]

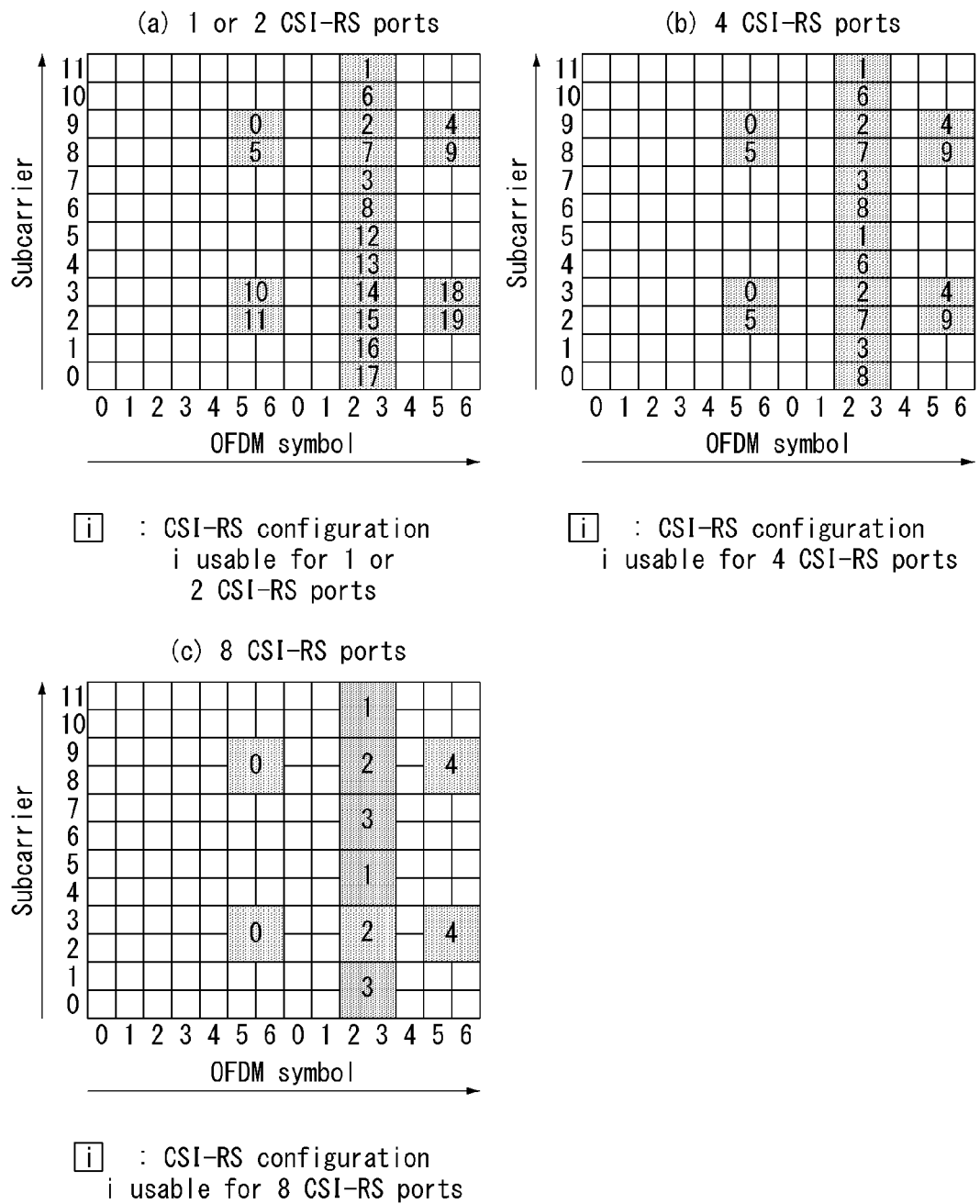

【FIG. 9】
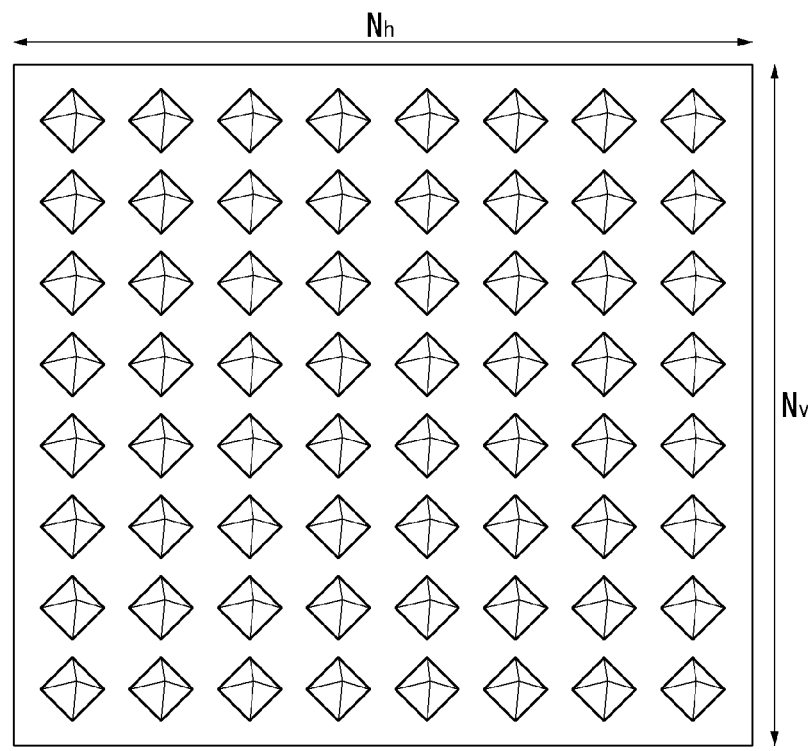
【FIG. 10】
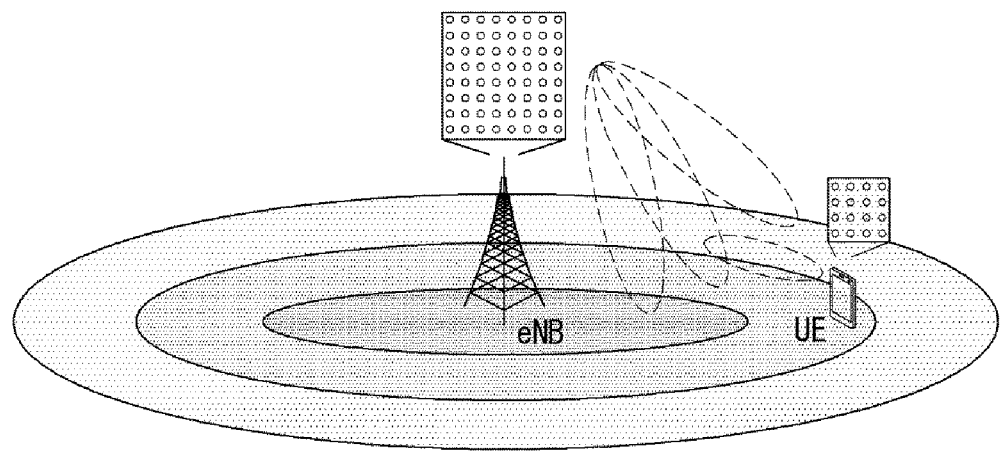

[FIG. 11]
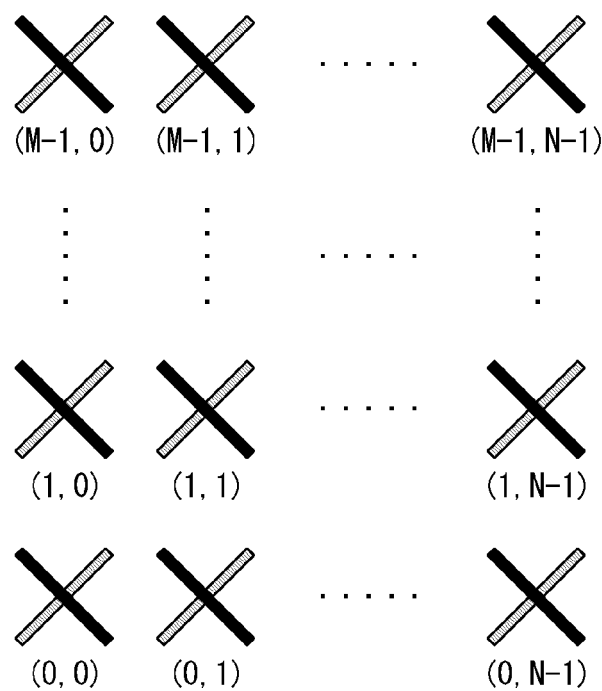

[FIG. 12]
(a)
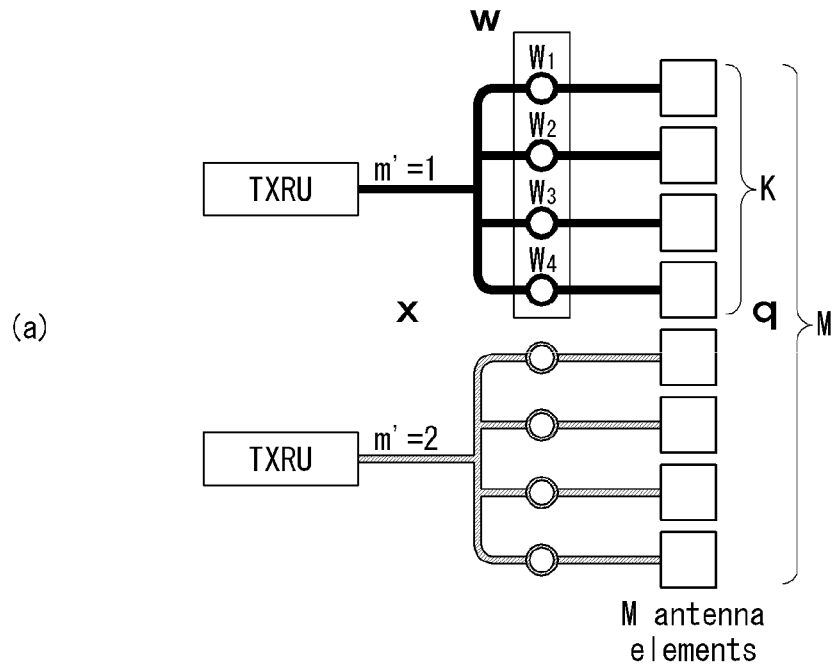
(b)
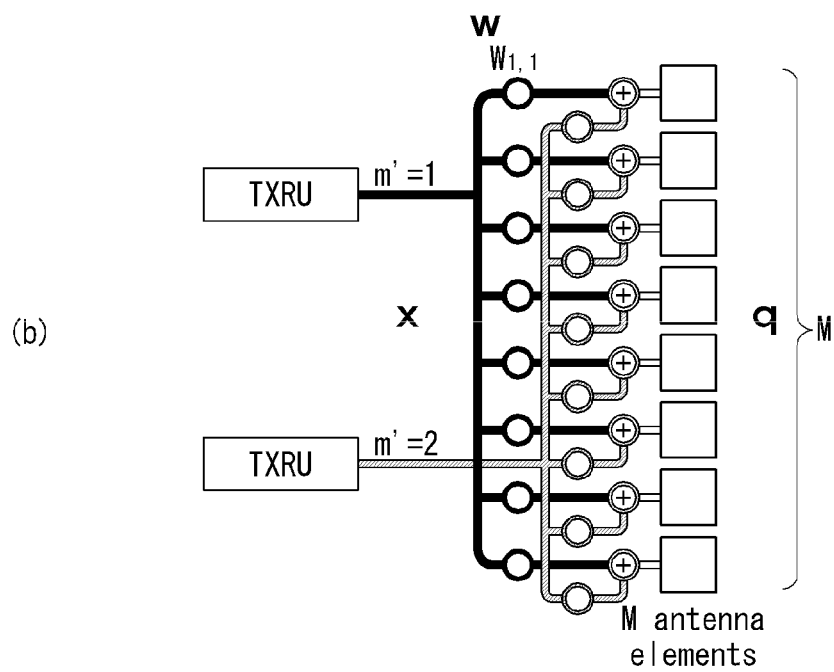

[FIG. 13]
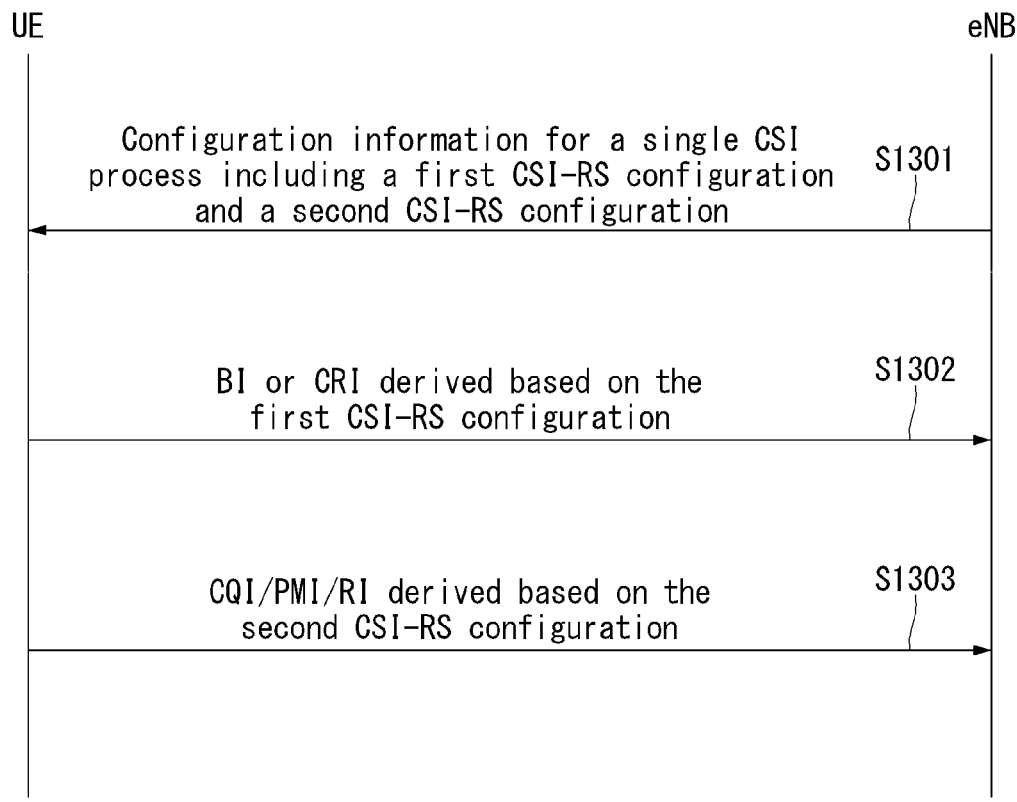
[FIG. 14]
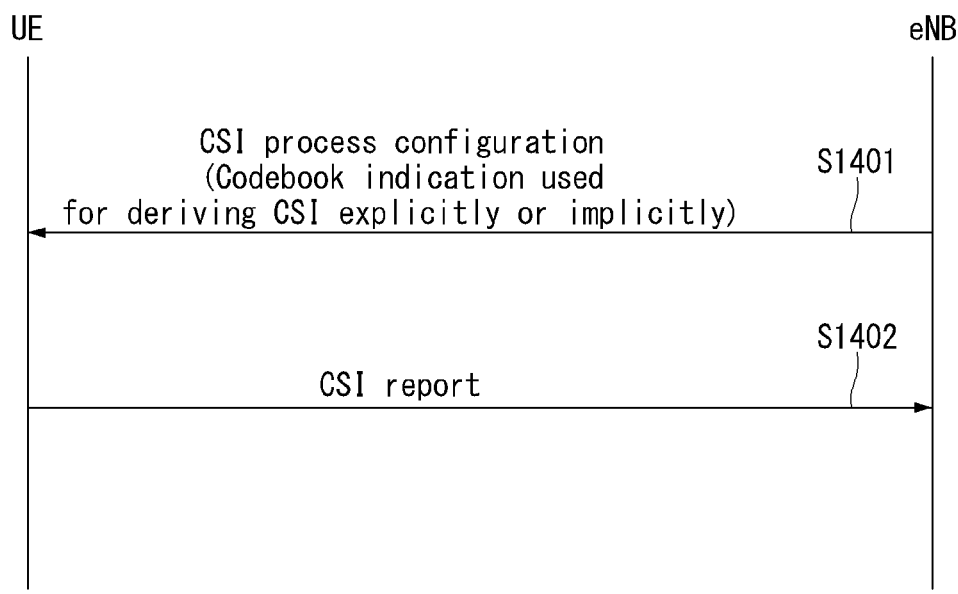

[FIG. 15]
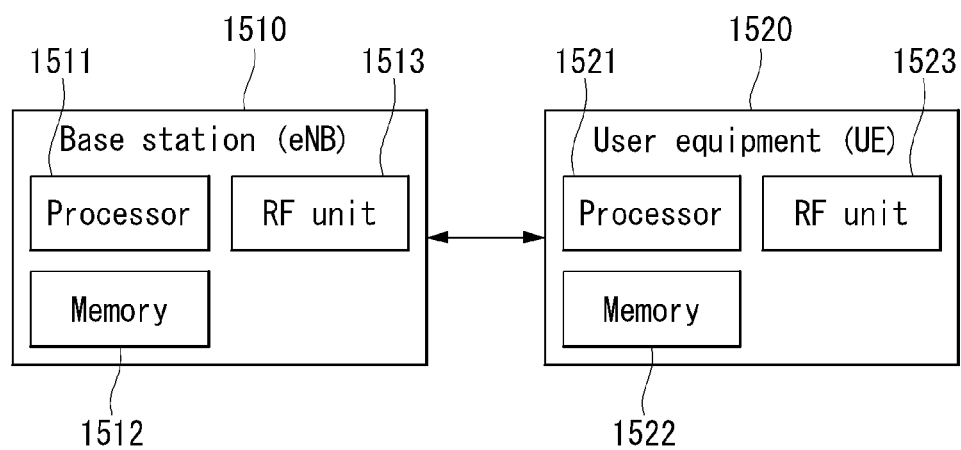

METHOD FOR TRANSMITTING AND RECEIVING CHANNEL STATE INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/011053, filed on Oct. 4, 2016, which claims the benefit of U.S. Provisional Application No. 62/236,973, filed on Oct. 4, 2015, the contents of which are all hereby incorporated by reference herein in their entirety.

TECHNICAL FIELD

The present invention relates to wireless communications, and more particularly, to a method for transmitting and receiving channel state information and a device for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for transmitting and receiving channel state information.

In addition, an object of the present invention is to propose a method for transmitting and receiving hybrid channel state information in order to support Multi Input Multi Output (MIMO) system.

In addition, an object of the present invention is to propose a method for transmitting and receiving channel state information for a channel state information process in which beamformed channel state information reference signal is transmitted.

Technological objects to be achieved by the present invention are not limited to the aforementioned objects, and other objects that have not been described may be clearly understood by a person having ordinary skill in the art to which the present invention pertains from the following description.

Technical Solution

According to an aspect of the present invention, a method for transmitting channel state information (CSI) performed by a user equipment (UE) in a wireless communication system may include receiving a CSI process configuration from a base station (BS); and reporting CSI corresponding to a CSI process configured by the CSI process configuration, when the CSI process is configured as a beamformed CSI-reference signal (CSI-RS) type and the CSI process is associated with a single CSI-RS resource, a codebook used for deriving the CSI may be indicated by the CSI process configuration.

According to another aspect of the present invention, a user equipment (UE) for transmitting channel state information (CSI) in a wireless communication system may include a radio frequency (RF) unit for transmitting and receiving a radio signal; and a processor for controlling the RF unit, wherein the processor is configured to perform: receiving a CSI process configuration from a base station (BS); and reporting CSI corresponding to a CSI process configured by the CSI process configuration, when the CSI process is configured as a beamformed CSI-reference signal (CSI-RS) type and the CSI process is associated with a single CSI-RS resource, wherein a codebook used for deriving the CSI may be indicated by the CSI process configuration.

Preferably, the CSI process configuration may include indication information that indicates whether a first codebook is used for deriving the CSI, and the first codebook may be a codebook for a beam selection and co-phasing between different polarization antennas.

Preferably, a single index for specifying a precoding matrix in the first codebook may be reported to the BS as a Precoding Matrix Indicator (PMI), when it is indicated to use the first codebook by the indication information.

Preferably, a pair of a first index for selecting a set of precoding matrixes from a second codebook and a second index for specifying a precoding matrix in the set of precoding matrixes specified by the first index may be reported to the BS as a Precoding Matrix Indicator (PMI), when it is not indicated to use the first codebook by the indication information.

Preferably, the first codebook may not be used, when a CSI measurement restriction (MR) is configured in the CSI process configuration.

Preferably, the first codebook may be used, when a CSI measurement restriction (MR) is not configured in the CSI process configuration.

Preferably, the CSI process configuration may include measurement restriction (MR) indication information indicating whether a CSI MR is configured.

Preferably, when the CSI process includes a first CSI-RS configuration associated with K, greater than 1, CSI-RS resources of beamformed CSI-RS type and a second CSI-RS configuration associated with one CSI-RS resource of beamformed CSI-RS type, the first codebook may not be used for a specific CSI-RS resource configured in the first CSI-RS configuration, and the first codebook may be used for a single specific CSI-RS resource in the second CSI-RS configuration.

Technical Effects

According to an embodiment of the present invention, hybrid channel state information is defined, and accordingly, the signaling overhead for reporting channel state information may be decreased.

In addition, according to an embodiment of the present invention, hybrid channel state information is defined, and accordingly, more channel state information processes may be configured to a user equipment.

In addition, according to an embodiment of the present invention, hybrid channel state information is defined, and accordingly, the number of transmission points that serve a user equipment may be maximized.

In addition, according to an embodiment of the present invention, various types for a channel state information process to which a single channel state information resource is set, and various operations of a user equipment may be supported, and accordingly, more accurate channel state information may be obtained.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 9 illustrates a 2D-AAS having 64 antenna elements in a wireless communication system to which the present invention may be applied.

FIG. 10 illustrates a system in which an eNB or UE has a plurality of transmission/reception antennas capable of forming a 3D beam based on the AAS in a wireless communication system to which the present invention may be applied.

FIG. 11 illustrates a 2D antenna system having cross-polarizations in a wireless communication system to which the present invention may be applied.

FIG. 12 illustrates a transceiver unit model in a wireless communication system to which the present invention may be applied.

FIG. 13 is a diagram illustrating a method for transmitting and receiving channel state information according to an embodiment of the present invention.

FIG. 14 is a diagram illustrating a method for transmitting and receiving channel state information according to an embodiment of the present invention.

FIG. 15 illustrates a block diagram of a wireless communication apparatus according to an embodiment of the present invention.

BEST MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ |  |  | 20480 · $T_s$ |  |  |
| 2 | 21952 · $T_s$ |  |  | 23040 · $T_s$ |  |  |
| 3 | 24144 · $T_s$ |  |  | 25600 · $T_s$ |  |  |
| 4 | 26336 · $T_s$ |  |  | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ |  |  |
| 6 | 19760 · $T_s$ |  |  | 23040 · $T_s$ |  |  |
| 7 | 21952 · $T_s$ |  |  | — | — | — |
| 8 | 24144 · $T_s$ |  |  | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \qquad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain× 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f=15$ kHz.

In a subframe configured for CSI-RS transmission, a CSI-RS sequence is mapped to a complex-valued modulation symbol $a\_k,l^(p)$ used as a reference symbol on each antenna port p as in Equation 12.

$$a_{k,l}^{(p)} = w_{l''} \cdot r_{l,n_s}(m') \quad \text{[Equation 12]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

|  | CSI reference signal configuration | Number of CSI reference signals configured ||||||
|---|---|---|---|---|---|---|---|
|  |  | 1 or 2 || 4 || 8 ||
|  |  | (k', l') | n_s mod 2 | (k', l') | n_s mod 2 | (k', l') | n_s mod 2 |
| Frame structure type 1 and 2 | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset $\Delta$_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Referring to Table 5, the CSI-RS transmission period T_CSI-RS and the subframe offset $\Delta$_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI-RS}) \bmod T_{CSI-RS} = 0 \quad \text{[Equation 13]}$$

In Equation 13, T_CSI-RS means a CSI-RS transmission period, $\Delta$_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is p_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 9 illustrates a 2D-AAS having 64 antenna elements in a wireless communication system to which the present invention may be applied.

FIG. 9 illustrates a common 2D antenna array. A case where N_t=N_v·N_h antennas has a square form as in FIG. 9 may be considered. In this case, N_h indicates the number of antenna columns in a horizontal direction, and N_v indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 10 illustrates a system in which an eNB or UE has a plurality of transmission/reception antennas capable of forming a 3D beam based on the AAS in a wireless communication system to which the present invention may be applied.

FIG. 10 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 11 illustrates a 2D antenna system having cross-polarizations in a wireless communication system to which the present invention may be applied.

A 2D planar antenna array model in which polarization is considered may be diagrammed as shown in FIG. 11.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 11, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 11, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 12 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 11 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 12(a) and a TXRU virtualization model option-2: full connection model as in FIG. 12(b) depending on a correlation between an antenna element and a TXRU.

Referring to FIG. 12(a), in the case of the sub-array partition model, an antenna element is partitioned into multiple antenna element groups, and each TXRU is connected to one of the groups.

Referring to FIG. 12(b), in the case of the full-connection model, the signals of multiple TXRUs are combined and transferred to a single antenna element (or the arrangement of antenna elements).

In FIG. 12, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 12, mapping between a TXRU and an antenna element (TXRU-to-element mapping) shows one example, but the present invention is not limited thereto. From the point of view of hardware, the present invention may be identically applied to mapping between a TXRU and an antenna element which may be implemented in various forms.

Method for Transmitting and Receiving Hybrid CSI

Rel-13 CSI Process Configuration

1. Introduction

A CSI process for supporting both techniques based on a non-precoded CSI-RS and a beamformed CSI-RS is as below.

The CSI process is associated with K (K>=1) CSI-RS resources/configurations. In this case, the number of CSI-RS ports for $k^{th}$ CSI-RS resource among total K CSI-RS resources/configurations is N_k.

For class A CSI report (i.e., CSI report based on non-precoded CSI-RS), the number of maximum CSI-RS ports in a single CSI process is 16.

For the class A CSI report, one of the following alternatives may be used.

Alt. 1: CSI-RS resource/configuration in which N_k is 12/16 may be predefined. That is, a CSI-RS configuration of which index is K=1 may be configured for a CSI process.

Alt. 2: K (K>=1) CSI-RS resources/configurations of 2/4/8 ports may be merged for 12/16 port CSI-RS.

In the case of class A CSI report and Class B CSI report (i.e., CSI report based on beamformed CSI-RS; in the case that CSI-IM is supported), one of the following alternatives may be selected for the CSI-IM and the CSI resource/configuration associated with a CSI-RS process.

Alt. 1: A single CSI process is in relation to a single CSI-IM (common interference measurement resource for all CSI-RS resources/configurations in a single CSI process).

Alt. 2: A single CSI process may be associated with a multiple of CSI-IMs.

An RRC signaling supports different CSI-RS resources/configurations associated with different CSI-IM resource configurations.

2. Configurations Related to Class A

Class A CSI report implies that a UE reports CSI according to codebook W=W1W2 based on {8, 12, 16} CSI-RS ports.

For an RRC configuration of CSI resource/configuration, one of the following alternatives may be selected.

Alt. 1: CSI-RS resource/configuration in which N_k is 12/16 may be predefined. That is, a CSI-RS configuration of which index is K=1 may be set for a CSI process.

Alt. 2: K (K>=1) CSI-RS resources/configurations of 2/4/8 ports may be merged for 12/16 port CSI-RS.

Alt. 1 means that at least one new CSI reference signal configuration (e.g., for 16 ports) is added and predefined (i.e., predetermined in the standard). In this case, when class A is indicated in the configuration, K=1 is always applied for the corresponding CSI process configuration. Alt. 1 has an advantage that minimizes UE implementation cases and an enhancement may be easily incorporated in a table which is defined in the existing standard.

Alt. 2 allows more flexibility in comparison with Alt. 1 in the RRC configuration accompanying K (>1) CSI-RS resources. Here, in order to perform the corresponding class A CSI report, these multiple CSI-RS resources that are going to be measured by a UE are aggregated. Although Alt. 2 has an advantage of network flexibility that aggregates K CSI-RS resources, it is needed to be considered so as to have a proper limitation in a configuration for a system configuration, particularly.

Proposal 1: Considering a significant performance degradation owing to phase drift, a maximum time difference between ports in a CSI-RS resource should be not greater than 0.28 ms.

Proposal 2: Under the assumption of satisfying the proposal provided in proposal 1, various available CSI-RS patterns may be listed up so as to determine whether Alt. 1 configuration is selected or Alt. 2 configuration is selected.

3. Configurations Related to Class B

The Class B CSI report assumes one of following four alternatives, and implies that a UE report L port CSI based on the measurements of K beamformed CSI-RS resources having respective N_k ports.

Alt. 1: An indicator for a beam selection and L port CQI/PMI/RI for the selected beam. The total number of configured ports throughout all CSI-RS resources in a CSI process is greater than L.

Alt. 2: L port precoder from a codebook that reflects all of beam selection(s) and co-phasing, commonly to two polarizations. The number of all configured ports in a CSI process is L.

Alt. 3: A codebook that reflects a beam selection and L port CSI for the selected beam. The total number of configured ports throughout all CSI-RS resources in a CSI process is greater than L.

Alt. 4: L port CQI/PMI/RI. The number of all configured ports in a CSI process is L (this is always configured when a CSI measurement restriction (MR) is supported.).

Particularly, for Alt. 1 and Alt. 3, in order for a UE to select at least one preferred beamformed CSI-RS resource in the entire K CSI-RS resources configured in a CSI process of Class B, the condition K>1 is always configured. For such a selection feedback, Alt. 1 is based on a beam indicator (BI) report. On the other hand, Alt. 3 is based on a selection codebook based report. Since Rel-13 is focused on a single beamformed CSI-RS resource selection owing to a limited time frame, Alt. 1 may be selected as a simple form of a selection feedback. On the other hand, in the next release, it is preferable to research an extended case of selecting one or more CSI-RS resources for obtaining a vertical rank greater than 1, and in this case, Alt. 3 based selection codebook structure may be more suitable.

For the maximum value of K in an RRC configuration of a newly defined CSI process, it is preferable to consider Class B report technique for representing the technique that shows the best performance and for researching the K value for the performance.

Proposal 3: Based on the Class B technique (combination of Alt. 1 (BI feedback) and Alt. 4 (always MR on) that shows the best performance, the maximum value of K may be 16 in Rel-13.

The maximum total number of CSI-RS ports in a single CSI process may be defined as 64 which is the same as the total number of TXRUs considered in Rel-13. In this case, In the case that the maximum value of K in a single CSI process is 16 based on proposal 1, N_k for each k CSI-RS resource may be 4. In another example, K=8 in a single CSI process and N_k for each k CSI-RS resource may be 8. In some case, the maximum total number of CSI-RS ports may be limited to 64 in a single CSI process.

Proposal 4: The maximum total number of CSI-RS ports in a single CSI process may be 64, which is the same as the number of total TXRUs considered in Rel-13.

4. Configurations Related to CSI-IM

Alt. 1: A single CSI process is associated with a single CSI-IM (common interference measurement resource throughout the entire CSI resources/configurations in a single CSI process)

Alt. 4: A single CSI process is associated with a multiple of CSI-IMs.

An RRC signaling supports different CSI resources/configurations associated with different CSI-IM resources configurations.

Such an issue is related to whether a CSI process configuration for Class B may be used for supporting a virtual sectorization scenario, which is assumed that each virtual sector independently operates for an individual CSI-IM resource to be set to a UE for each sector. More particularly, in the case that an independent CSI-IM resource associated with $k^{th}$ (here, k=1, 2, . . . , k) CSI-RS resource is supported in a single CSI process configuration, a CSI-RS resource selection feedback preferred by a UE may be efficiently used for dynamic virtual sector selection operation. Moreover, in the case that each CSI-RS is transmitted from different transmission points (TPs), such a CSI process configuration may also be used for CoMP operation in a distributed antenna scenario. In summary, it is not preferable to limit the cases of the CSI process configuration based on Class B.

Proposal 5: By permitting an independent CSI-IM resource associated with $k^{th}$ (here, k=1, 2, . . . , k) CSI-RS resource, it may be beneficial to support a flexible utilization of a Rel-13 CSI process for Class B depending on a network implementation.

Beamformed CSI-RS Configuration

1. Introduction

A CSI report accompanies PMI.

A CSI process may be configured as two CSI report classes A and B.

For class A, a UE reports CSI according to W=W1W2 codebook based on {8, 12, 16} CSI-RSs.

For Class B, a UE reports L port CSI by assuming one of the following alternatives.

Alt. 1: An indicator for a beam selection and L port CQI/PMI/RI for the selected beam. The total number of configured ports across all CSI-RS resources in a CSI process is greater than L.

Alt. 2: L port precoder from a codebook that reflects all of beam selection(s) and co-phasing, commonly to two polarizations. The number of all configured ports in a CSI process is L.

Alt. 3: A codebook that reflects a beam selection and L port CQI for the selected beam. The total number of configured ports across all CSI-RS resources in a CSI process is greater than L.

Alt. 4: L port CQI/PMI/RI. The number of all configured ports in a CSI process is L (this is always configured when a CSI measurement restriction (MR) is supported.).

Here, a beam selection may be a selection of a subset of an antenna port in a single CSI-RS resource or a selection of a CSI-RS resource from a resource set.

In addition, the reported CSI may correspond to an extension of Rel-12 L port CSI.

For alternatives 1, 2, 3 and 4 of the CSI report Class B, N_k ∈{1, 2, 4, 8}.

For Alt. 1, a UE reports L port CSI by assuming one of L=N_k or L (<=N_k)(this may be preconfigured or fixed.).

For Alt. 2, a UE reports L port CSI. In this case, L may be a summation for all k's (i.e., L=sum(N_k)) or K may be 1 for all cases (i.e., L=N_1).

For Alt. 3, a UE reports L port CSI by assuming one of L=N_k or L (<=N_k)(this may be preconfigured or fixed.).

For Alt. 4, a UE reports L port CSI by assuming L=N_k.

2. Merge Operation Proposed for Class B CSI Report

Among the four alternatives above, both of Alt. 1 and Alt. 3 have the similar operation purpose, and here, in order for a UE to select at least one preferred beamformed CSI-RS resource among total K CSI-RS resources configured in a CSI process for Class B, K>1 is generally considered. For such a selection feedback, Alt. 1 is based on a beam indicator (BI) report and Alt. 3 is based on a selection codebook based report. Since Rel-13 is focused on a single beamformed CSI-RS resource selection owing to a limited time frame, Alt. 1 may be selected as a simple form of a selection feedback. On the other hand, in the next release, it is preferable to research an extended case of selecting one or more CSI-RS resources for obtaining a vertical rank greater than 1, and in this case, Alt. 3 based selection codebook structure may be more suitable.

Observation 1: Between Alt. 1 and Alt. 3, considering that Rel-13 is focused on a single beamformed CSI-RS resource selection, it may be enough to select Alt. 1 as a simple form of a selection feedback.

Since Alt. 2 may be dependent upon a short-term W2 feedback only from a UE, Alt. 2 has different motivation from Alt. 1 or Alt. 3. Here, it may be interpreted that W1 beamforming coefficient may be applied in advance to the beamformed CSI-RS resource of which K=1 always for a CSI process.

For such a beamforming coefficient, different beam directions may be applied in advance for each port pair that has different polarizations. Accordingly, W2 feedback of a UE may be utilized in an eNB as beam selection information as well as co-phasing for different polarizations. However, in the aspect of performance, this technique of Alt. 2 may be more sensitive in a beam coefficients adaptation frequency than the technique based on Alt. 1. This is caused by the fact Alt. 1 is based on a CSI-RS resource selection such that W1 and W2 mainly are reported by a UE on the selected CSI-RS resource. On the contrary, since the existing W1 component may not be accepted by a CSI feedback of a UE, the technique of Alt. 2 is based on W2 feedback only by the UE.

Observation 2: Since W1 feedback is excluded from a CSI feedback of a UE and replaced by an eNB implementation, Alt. 2 accompanied by W2 feedback only shows a more sensitive result in a beam coefficients adaptation frequency than the technique based on Alt. 1.

Alt. 4 is for L port CSI report by assuming that a measurement restriction (MR) is always-on. Here, this means that the total configured number of ports in a CSI process is also L and a CSI-RS resource of K=1 is configured in a CSI process. The technique of Alt. 4 may be utilized very efficiently for a beamformed CSI-RS based operation in the aspect that network CSI-RS overhead is significantly decreased by CSI-RS pooling between multiple UEs. More particularly, the CSI process based on Alt. 4 may be configured to a UE and a CSI-RS measurement instance of the UE may be controlled by an eNB, for example, L1 signaling. Accordingly, the CSI feedback of the UE may be performed based on the indicated measurement instance, and the other CSI-RS transmission instances may be reused for CSI feedbacks of the other UEs. Consequently, network overhead may be significantly decreased.

Since different UE-specific beamformed coefficients may be applied to the CSI-RS resource based on Alt. 4, the technique of Alt. 4 may be preferable to support an efficient beamformed CSI-RS based operation.

Observation 3: It is preferable that Alt. 4 with the always-on MR is supported for saving network CSI-RS overhead significantly by CSI-RS resource pooling among multiple UEs.

Based on the observations and the analysis for the beamformed CSI-RS based techniques, the following operation based on two CSI processes set to a UE may be considered.

i) CSI process #1 of Class B based on Alt. 1: K (>1) CSI-RS resources are set.

An eNB transmits K CSI-RSs periodically. The transmission period may be long, for example, 50 ms, 100 ms, and so on.

A UE reports RI/PMI/CQI on a selected CSI-RS resource as well as BI.

The report period of BI may be longer than that of the CSI.

The reported BI may be utilized for transmitting the CSI-RS associated with CSI process #2.

ii) CSI process #2 of Class B based on Alt. 4: K=1 CSI-RS is set.

An eNB uses the reported BI in a single measurement subframe triggered to a UE, and applies it to the CSI-RS for transmitting a UE-specific beamforming coefficient.

A UE reports RI/PMI/CQI based on the single measurement subframe which is triggered.

According to the operation, the configured CSI-RS resource may be reused among multiple UEs. Here, the applied beamforming coefficient may be freely selected by an eNB on each CSI-RS transmission instance.

Proposal 1: A merged operation between Alt. 1 accompanying the BI feedback and Alt. 4 with the single subframe measurement restriction is supported in Rel-13.

CSI Report of Class B Accompanying BI Feedback

1. Introduction

A CSI report accompanies PMI.

A CSI process may be configured as two CSI report classes A or B.

For class A, a UE reports CSI according to W=W1W2 codebook based on {8, 12, 16} CSI-RS ports.

For Class B, a UE reports L port CSI by assuming one of the following alternatives.

Alt. 1: An indicator for a beam selection and L port CQI/PMI/RI for the selected beam. The total number of configured ports across all CSI-RS resources in a CSI process is greater than L.

Alt. 2: L port precoder from a codebook that reflects all of beam selection(s) and co-phasing, commonly to two polarizations. The number of all configured ports in a CSI process is L.

Alt. 3: A codebook that reflects a beam selection and L port CSI for the selected beam. The total number of configured ports across all CSI-RS resources in a CSI process is greater than L.

Alt. 4: L port CQI/PMI/RI. The number of all configured ports in a CSI process is L (this is always configured when a CSI measurement restriction (MR) is supported.).

Here, a beam selection may be a selection of a subset of an antenna port in a single CSI-RS resource or a selection of a CSI-RS resource from a resource set.

In addition, the reported CSI may correspond to an extension of Rel-12 L port CSI.

For alternatives 1, 2, 3 and 4 of the CSI report Class B, $N\_k \in \{1, 2, 4, 8\}$.

For Alt. 1, a UE reports L port CSI by assuming one of L=N_k or L (<=N_k)(this may be preconfigured or fixed.).

For Alt. 2, a UE reports L port CSI. In this case, L may be a summation for all k's (i.e., L=sum(N_k)) or K may be 1 for all cases (i.e., L=N_1).

For Alt. 3, a UE reports L port CSI by assuming one of L=N_k or L (<=N_k)(this may be preconfigured or fixed.).

For Alt. 4, a UE reports L port CSI by assuming L=N_k.

2. Discussion i) CSI process #1 of Class B based on Alt. 1: K (>1) CSI-RS resources are configured.

An eNB transmits K CSI-RSs periodically. The transmission period may be long, for example, 50 ms, 100 ms, and so on.

A UE reports RI/PMI/CQI on a selected CSI-RS resource as well as a BI.

The report period of a BI may be longer than that of the CSI.

The reported BI may be utilized for transmitting the CSI-RS associated with CSI process #2.

ii) CSI process #2 of Class B based on Alt. 4: K=1 CSI-RS is configured.

An eNB uses the reported BI in a single measurement subframe triggered to a UE, and applies it to the CSI-RS for transmitting a UE-specific beamforming coefficient.

A UE reports RI/PMI/CQI based on the single measurement subframe which is triggered.

According to the operation, the configured CSI-RS resource may be reused among multiple UEs. Here, the applied beamforming coefficient may be freely selected by an eNB on each CSI-RS transmission instance.

Considering that the efficient operation is going to be utilized, a maximum number of CSI-RS resources that may be configured for CSI process #1 may be required. In an evaluation for determining a maximum value of K, an antenna configuration (8, 2, 2 and 32) is considered. 1×, 2× and 4× oversampling for a vertical domain is applied, and accordingly, each of the case that K=8, 16 and 32 is considered in the evaluation. Briefly, N_k=4 is the same for all of k(=1, 2, . . . , K), and accordingly, the number of total CSI-RS ports in CSI process #1 is N_k·K. Considering ZP-CSI-RS overhead also, the entire CSI-RS overhead for CSI process #1 is 3·N_k·K (when 3 cell reuse factor is considered). It is assumed that the CSI-RS for CSI process #1 is transmitted in the same period as the BI feedback period, and it is evaluated with 50 ms, 100 ms or 200 ms below in Table 7.

In CSI process #2, CSI-RS overhead is applied according to the number of separate BIs (denoted by Y) reported from all active UEs in a site (including 3 cells), and accordingly, the entire CSI-RS overhead including ZP-CSI-RS(s) for each site is N_k·Y. For example, in the case that there are 4 active UEs, one of the UEs reports BI=1 and the remaining 3 UEs report BI=3 in the same way, the number of the reported separate BIs is Y=2, and accordingly, the entire CSI-RS overhead for CSI process #2 is N_k·2.

Table 6 below summarizes the number of REs for NZP and ZP CSI-RS(s) for each site and the average CSI-RS overhead (in a unit of RE(s)/RB/subframe) which is used in a simulation for CSI processes #1 and #2. Wideband BI report is considered, and another simulation assumption is described in Table 9 below.

Table 6 exemplifies CSI-RS overhead assumptions for a simulation for N_k=4.

TABLE 6

|  | CSI process #1 | CSI process #2 |
|---|---|---|
| Number of REs for NZP and ZP CSI-RSs | 3 · N_k · K | N_k · Y |
| Average CSI-RS overhead (REs/RB/subframe) | 0.24 · K (for 50 ms period)<br>0.12 · K (for 100 ms period)<br>0.06 · K (for 200 ms period) | 0.8 · Y |

Table 7 exemplifies a non-full buffer simulation result for K=8, 16 or 32 CSI-RS resource in 3D-Urban Micro (UMi) scenario.

TABLE 7

|  | Average UE yield (bps/Hz) | Average UE yield gain | 5% UE yield (bps/Hz) | 5% UE yield gain | 50% UE yield (bps/Hz) | Resource utilization | FTP load, λ (UEs/s/sector) |
|---|---|---|---|---|---|---|---|
| 8 beams | 3.880 | — | 1.476 | — | 4.211 | 0.16 | 1.5 |
| 16 beams | 3.871 | 100% | 1.504 | 102% | 4.167 | 0.15 |  |
| 32 beams | 3.780 | 97% | 1.418 | 96% | 4.000 | 0.16 |  |
| 8 beams | 2.955 | — | 0.762 | — | 2.685 | 0.34 | 2.5 |
| 16 beams | 2.964 | 100% | 0.786 | 103% | 2.731 | 0.34 |  |
| 32 beams | 2.829 | 96% | 0.731 | 96% | 2.564 | 0.35 |  |
| 8 beams | 2.173 | — | 0.324 | — | 1.717 | 0.59 | 3.5 |
| 16 beams | 2.204 | 101% | 0.351 | 108% | 1.770 | 0.57 |  |
| 32 beams | 2.053 | 95% | 0.308 | 95% | 1.606 | 0.60 |  |

As represented in Table 6, the case of 16 vertical beams shows slightly better performance in comparison with the cases of 8 and 32 vertical beams, particularly, in the case of 5% UE. In the case of 16 beams, in comparison with 8 beams, it is evaluated that the throughput increment owing to a vertical beam increase is better than the corresponding CSI-RS overhead increment. In the case of 16 beams, in comparison with 32 beams, since the throughput increment owing to a vertical beam increase is marginal, such a tendency is shown reversely. Therefore, it may be considered that 16 beams are enough to attain the throughput gain for a beamformed CSI-RS based operation.

Proposal 1: Based on the observation of the maximum throughput gain for a beamformed CSI-RS based operation, a maximum value of K may be 16.

The result of vertical beam selection of a UE may be reported through BI feedback as in Alt. 1. The evaluation result according to different BI feedback periods is given as represented below. A CSI process configuration and CSI-RS overhead are assumed in the same way as the evaluation described above. 50/100/200 ms are used for BI periods, and the case of 16 beams is used for the following evaluation by considering the most high performance than the 8 and 32 beam cases from Table 6 above.

Table 8 exemplifies a non-full buffer simulation result for 50/100/200 ms BI periods in 3D-Urban Micro (UMi) scenario.

TABLE 8

|  | Average UE yield (bps/Hz) | Average UE yield gain | 5% UE yield (bps/Hz) | 5% UE yield gain | 50% UE yield (bps/Hz) | Resource utilization | FTP load, λ (UEs/s/sector) |
|---|---|---|---|---|---|---|---|
| 50 ms BI period | 3.871 | — | 1.504 | — | 4.167 | 0.15 | 1.5 |
| 100 ms BI period | 3.868 | 100% | 1.509 | 99% | 4.124 | 0.16 |  |
| 200 ms BI period | 4.050 | 100% | 1.509 | 104% | 4.348 | 0.15 |  |
| 50 ms BI period | 2.964 | — | 0.786 | — | 2.731 | 0.34 | 2.5 |
| 100 ms BI period | 2.982 | 102% | 0.803 | 100% | 2.740 | 0.34 |  |

TABLE 8-continued

|  | Average UE yield (bps/Hz) | Average UE yield gain | 5% UE yield (bps/Hz) | 5% UE yield gain | 50% UE yield (bps/Hz) | Resource utilization | FTP load, λ (UEs/s/sector) |
|---|---|---|---|---|---|---|---|
| 200 ms BI period | 3.035 | 102% | 0.802 | 100% | 2.740 | 0.34 | |
| 50 ms BI period | 2.204 | — | 0.351 | — | 1.770 | 0.57 | 3.5 |
| 100 ms BI period | 2.223 | 103% | 0.359 | 103% | 1.818 | 0.57 | |
| 200 ms BI period | 2.251 | 106% | 0.371 | 100% | 1.778 | 0.56 | |

As the BI feedback period is changed, the entire throughput is not changed significantly. This is because the throughput gains obtained by low CSI-RS overhead may compensate the throughput degradation caused by the increased BI period. In other words, longer BI feedback does not influence on a throughput, and considering the complexity of network and UE, such a long (e.g., 100 ms) BI feedback period may be preferable.

Proposal 2: In a system in which long BI feedback period (e.g., 100 ms and 200 ms) is considered, generally, a marginal increase of CSI-RS overhead is accompanied, and it is observed that it is adequate for the beamformed CSI-RS based operation.

Table 9 represents simulation parameters and assumptions.

TABLE 9

| | |
|---|---|
| Scenario | 3D-UMi of which ISD = 200 m in 2 GHz |
| BS antenna configuration | Antenna element configuration: 8 × 2 × 2 (+/−45), 0.52λ horizontal/0.8 λ vertical antenna spacing |
| MS antenna configuration | 2 Rx X-pol (0/+90) |
| System bandwidth | 10 MHz (50 RBs) |
| UE attachment | Based on RSRP (formula) from CRS 0 port |
| Duplex | FDD |
| Network synchronization | Synchronized |
| UE distribution | Following TR36.873 |
| UE speed | 3 km/h |
| Polar antenna modeling | Model-2 of TR36.873 |
| UE array orientation) | Uniformly distributed in angle $\Omega\_UT$, $\alpha$ [0, 360], $\Omega\_UT$, $\beta$ = 90 degree, $\Omega\_UT$, $\gamma$ = 0 degree |
| UE antenna pattern | Isotropic antenna gain pattern $A'(\theta', \phi') = 1$ |
| Traffic model | FTP model of which packet size is 0.5 Mbytes 1 (low ~20% RU, middle ~50% RU, high ~70% RU) [3] |
| Scheduler | Frequency selective scheduling (multiple UEs for each TTI are allowed.) |
| Receiver | Non-ideal channel estimation and interference modeling, particular guideline follows Rel-12 [71-12] assumption LMMSE-IRC receiver, particular guideline follows Rel-12 [71-12] assumption |
| CSI-RS, CRS | CSI-RS port is mapped to all TXRUs corresponding to a column of co-polarized antenna element, CRS port 0 is associated with the first column of +45 degree polarization wave, and CRS port 0 is mapped to the first TXRU. |
| Hybrid ARQ | Transmitted maximum four times |
| Feedback | PUSCH 3-2 CQI, PMI and RI report triggered on every 5 ms Feedback delay is 5 ms. Rel-8 4Tx codebook for horizontal PMI feedback |
| Overhead | DM-RS mapped to 3 symbols for DL CCHs, 2 CRS port and 12 REs per PRB. CSI-RS overhead is described. |
| Transmission technique | Dynamic SU/MU-MIMO (no CoMP) accompanying TM10, 2 CSI process and rank adaptation |
| Wrapping method | Based on Geographical distance |
| Handover margin | 3 dB |
| Metrics | Average UE yield, 5% UE yield, 50% UE yield |

Hereinafter, for example, in order to support multi-antenna MIMO system that may be referred to as enhanced beamforming (EBF), Full-Dimension MIMO (FD-MIMO), massive MIMO, and the like, the present invention proposes a method for transmitting and receiving hybrid CSI for a single CSI process and a method for configuring such a CSI report.

The CSI process report of Class B type has been discussed as below.

The number L of antenna ports for CSI may be 2, 4 or 8, for example. That is, as described above, a plurality of CSI-RS resources (i.e., a plurality of beams) may be configured in Class B type, and in this case, the number of CSI-RS antennas for each CSI-RS resource may be 2, 4 or 8.

In addition, the following four alternatives (or a part of them) may be defined, and one of the defined alternatives may be used.

Class B Alt. 1:
i) A beam selection indicator (BI) (or CSI-RS resource indicator (CRI)) may be defined. In this case, the BI (or CRI)

may be determined based on Reference Signal Received Power (RSRP) or CSI. In addition, the BI (or CRI) may be determined throughout wideband or in a unit of subband. Further, the BI (or CRI) may be determined in a short-term or a long-term.

ii) A BI bit width may be associated with K (the total number of beams (or CSI-RS resources)).

iii) A UE-specific beamforming for a rank greater than 2 (rank>2) may be supported.

iv) On PUCCH/PUSCH, CSI may be reported according to uplink control information (UCI) feedback mechanism.

Class B Alt. 2:

i) Codebook (e.g., derived from the legacy codebook(s) or codebook component(s) or newly designed) for a beam selection and co-phasing may be used. In this case, the related PMI may also be reported (e.g., it may be assumed that W=W2 in the newly designed or the legacy codebook).

ii) CSI may be reported according to UCI feedback mechanism on PUCCH/PUSCH.

Class B Alt. 3:

i) Codebook for a beam selection and CSI may be used. In this case, PMI may include the information of a selected beam or a precoding matrix for an L port in the selected beam.

ii) CSI may be reported according to UCI feedback mechanism on PUCCH/PUSCH.

Class B Alt. 4:

i) A measurement restriction (MR) mechanism may be used.

Meanwhile, the measurement restriction (MR) may also be applied to Alt. 1 to Alt. 3.

For the beamformed CSI-RS based operation including aperiodic CSI-RS transmission use cases, as described above, a new CSI report of beam indicator (BI) (or CRI) type is required.

The technique of the Class B operation may represent a significant performance when two CSI processes are set to a UE as described below.

i) CSI process #1 of Class B: For example, in the case that the CSI process of Class B based on Alt. 1 is configured, K (>1) CSI-RS resources may be configured.

An eNB may transmit K CSI-RSs periodically. In this case, the transmission period may be long, for example, 50 ms, 100 ms, and so on.

A UE may report a BI (or CRI). In addition, a UE may report RI/PMI/CQI on a selected CSI-RS resource as well as the BI (or CRI).

The report period of the BI (or CRI) may be longer than that of the CSI.

The reported BI (or CRI) may be utilized for transmitting the CSI-RS associated with CSI process #2.

ii) CSI process #2 of Class B: For example, in the case that the CSI process of Class B based on Alt. 4 is configured, K=1 CSI-RS resource may be configured.

An eNB may apply UE-specific beamforming coefficients when transmitting a CSI-RS by using the reported BI (or CRI). In this case, in a single measurement subframe triggered to a UE, the CSI-RS may be transmitted.

A UE may report RI/PMI/CQI based on the received CSI-RS. In this case, a UE may report RI/PMI/CQI based on a single measurement subframe.

According to the operation of reporting RI/PMI/CQI based on a single measurement subframe as such, a configured CSI-RS resource may be reused among multiple UEs. Here, the applied beamforming coefficients may be selected by an eNB on each CSI-RS transmission instance.

As described above, each of two CSI process configurations may be set to a UE, but it may be preferable that two processes may be combined in a single CSI process configuration.

As such, a combination of processes for two (or more) CSI reports in a single CSI process configuration may be referred to as 'hybrid CSI'. That is, the hybrid CSI means a CSI report type including two (or more) CSI-RS configurations in a single CSI process.

In this case, each of the CSI-RS configurations may be set to one of class A and Class B. For example, for the corresponding CSI-RS configuration, when an RRC parameter 'eMIMO-Type' is set to 'non-precoded', this may correspond to the CSI-RS configuration of class A, and 'eMIMO-Type' is set to 'beamformed', this may correspond to the CSI-RS configuration of Class B.

Hereinafter, in describing the present invention, for the convenience of description, the case is mainly described that two CSI-RS configurations (a first CSI-RS configuration and a second CSI-RS configuration) are included in a single CSI process, and a type of each CSI-RS configuration is set to Class B, but the present invention is not limited thereto.

More particularly, the combined CSI process (i.e., hybrid CSI) may have K+1 CSI-RS resources, and here, a CSI feedback of a UE may be based on 'a particular CSI-RS resource' and a BI (or CRI) feedback may be based on the remaining K CSI-RS resources. In other words, the first CSI-RS configuration (i.e., a first eMIMO-type) may correspond to Class B CSI-RS configuration that has K (>1) CSI-RS resources, and the second CSI-RS configuration (i.e., a second eMIMO-type) may correspond to Class B CSI-RS configuration that has one CSI-RS resource.

In this case, a particular CSI-RS resource may be fixedly defined as a CSI-RS resource to which lowest or highest index is provided among the K+1 CSI-RS resources, or may be set by a UE.

Alternatively, the particular CSI-RS resource(s) indicated through a higher layer signaling (e.g., RRC signaling) among the K+1 CSI-RS resources may be configured for the above-described purpose (e.g., CSI-RS resource pooling among UEs, aperiodic CSI-RS transmission use case, etc.).

As a more particular example, in the case that total K+1=5 CSI-RSs are set in a single CSI process (i.e., hybrid beamformed CSI-RS transmission purpose, etc.), among these, the case may be considered that CSI-RS 1 may be configured as 5 ms period (as a form shared and operated among users with aperiodic pooling, a measurement restriction activation (MR-on) may be set always. For example, only in 'one-shot MR (only in a subframe or a short window duration which is preconfigured), a channel measurement is derived based on an NZP CSI-RS resource or an interference measurement is derived based on a CSI-IM resource), and all of the remaining CSI-RSs 2 to 5 may be configured as 50 ms period and periodically transmitted as different cell-specific beamformed CSI-RS.

Such a configuration situation (i.e., hybrid CSI is set), when aperiodic CSI report is triggered by a UL DCI format from an eNB, a UE may perform A-CSI report according to at least one scheme among the following options.

Option 1: A UE may report a BI (or CRI) and CSI to an eNB at a time (e.g., together with a single subframe). In other words, both of the CSI for the first CSI-RS configuration (i.e., the first eMIMO-type) and the CSI for the second CSI-RS configuration (i.e., the second eMIMO-type) may be reported to an eNB at a time.

In this case, assuming the above example, when calculating a BI (or CRI), only four CSI-RS resources are compared, and a preferred BI (or CRI) may be calculated and reported. When calculating CSI, for example, only CSI-RS 1 to which a lowest index is given may be calculated, and the CSI may be reported.

Distinctively, this has a characteristic that two reports of separate concept are combined together in the present time and reported, the meaning of the BI (or CRI) feedback in this case is reporting a preferred BI (or CRI) in the present time for later A-CSI report in advance for the future and CSI report is reporting the presently applied beamformed CSI-RS.

That is, between the first CSI-RS configuration (i.e., the first eMIMO-type) and the second CSI-RS configuration (i.e., the second eMIMO-type) included in the hybrid CSI set to a UE, an interdependence is not existed for CSI (e.g., CQI, RMI and RI) calculation.

In other words, the CSI (e.g., CQI, RMI and RI) for the second CSI-RS configuration (i.e., the second eMIMO-type) is independently derived from the CSI for the first CSI-RS configuration (i.e., the first eMIMO-type) (or CSI-RS resource indicated by BI (or CRI)).

Option 2: As another method, it may be defined or configured to a UE such that a UE reports only CSI (e.g., RI, RMI, CQI, etc.) when reporting A-CSI with respect to A-CSI triggering.

That is, a preferred BI (or CRI) may be reported as another report form such as a BI feedback is performed by a periodic report. In such an A-CSI report, it may be identified by a UE that a CSI report is aperiodically triggered only for the corresponding beamformed CSI-RS 1 which is currently applied, and a UE operation may be performed.

Option 3: Or, on the contrary, it may be defined or configured to a UE such that a UE reports only the BI (or CRI) when reporting A-CSI with respect to A-CSI triggering.

As a mixed form between the methods described above, it may also be applied a method of indicating dynamically (e.g., using a first layer (PHY) control signaling (e.g., PDCCH)), when A-CSI triggering, that a UE performs an A-CSI report according to an option among the options.

For example, as described in options 2 and 3, when an A-CSI report is triggered, a UE may report a CSI (i.e., at least one of specific CSI contents such as BI/CRI, RI, PMI, CQI, etc. that are interlinked with the corresponding CSI-RS configuration in advance) for any one of the first CSI-RS configuration (i.e., the first eMIMO-type) and the second CSI-RS configuration (i.e., the second eMIMO-type) to an eNB. In this case, the eNB may include 1 bit indicator in the DCI for triggering the A-CSI report, and may indicate for the UE to report a CSI (i.e., at least one of specific CSI contents such as BI/CRI, RI, PMI, CQI, etc. that are interlinked with the corresponding CSI-RS configuration in advance) for any one of the first CSI-RS configuration (i.e., the first eMIMO-type) and the second CSI-RS configuration (i.e., the second eMIMO-type).

Alternatively, it may be configured for the UE to perform the A-CSI report according to an option among the options by a higher layer signal (e.g., RRC signaling).

In addition, in the case of a periodic CSI (P-CSI) in such a configuration situation (i.e., situation that the hybrid CSI is configured), a UE may calculate a preferred BI (or CRI) and report for CSI-RSs 2 to 5 for the BI (or CRI) report instance, and may perform a CSI measurement and report for the CSI-RS in the form of applying the particular MR always for other CSI report instances.

At this time, in the case that a measurement window having a specific duration, not a single subframe MR, is configured, the operation such as a UE initializes a measurement window may be applied together from the time (or after m (=0 or 4, etc.) subframe) when the preferred BI is reported by different value (i.e., a different value from the previously reported BI (or CRI) is reported) particularly.

That is, since the BI is changed, by initializing a measurement average, the eNB may apply a new measurement window from the time when beamforming coefficients to be newly applied are applied in the CSI-RS 1.

Hereinafter, a method for configuring the hybrid CSI to a UE is described. An eNB may configure the hybrid CSI to the UE through a higher layer signaling (e.g., RRC signaling).

A CSI process may be configured to a UE with 'CSI-Process' which is an RRC information element (IE), and the CSI-Process is a CSI process configuration that a network may configure on a serving frequency. 'CSI-Process' IE includes 'csi-RS-ConfigNZPId' which is an RRC parameter, and 'csi-RS-ConfigNZPId' represents an NZP CSI-RS configuration configured to the same frequency as the CSI process. That is, one NZP CSI-RS configuration is configured to a UE as a default.

In addition, for a Rel-13 UE, eMIMO-type which is an RRC parameter is additionally configured, and as described above, eMIMO-type indicates 'nonPrecoded' and 'beamformed' values that correspond to 'CLASS A' and 'CLASS B', respectively. Further, according to the eMIMO-type value, the CSI-RS configuration corresponding to 'CLASS A' (i.e., 'CSI-RS-ConfigNonPrecoded' field) or the CSI-RS configuration corresponding to 'CLASS B' (i.e., 'CSI-RS-ConfigBeamformed' field) is configured to a UE.

For example, the hybrid CSI may be indicated by the eMIMO-type included in the 'CSI-Process'. In this case, two CSI-RS configurations may be included in the hybrid CSI configuration as below.

i) As described above, in the case that Class B CSI-RS configuration having K (>1) CSI-RS resources (i.e., the first CSI-RS configuration or the first eMIMO-type) and Class B CSI-RS configuration having a CSI-RS resource (i.e., the second CSI-RS configuration or the second eMIMO-type) are configured to a UE as the hybrid CSI, the 'CSI-RS-ConfigBeamformed' field for specifying each CSI-RS configuration may be set to two UEs.

In this case, the 'CSI-RS-ConfigBeamformed' for specifying the first CSI-RS configuration (i.e., the first eMIMO-type) may include 1 to 7 (i.e., K−1) NZP CSI-RS configurations (since one NZP CSI-RS configuration is already configured to a UE as a default) and the 'CSI-RS-ConfigBeamformed' for specifying the second CSI-RS configuration (i.e., the second eMIMO-type) may include an NZP CSI-RS configuration.

Alternatively, the 'CSI-RS-ConfigBeamformed' for specifying the first CSI-RS configuration (i.e., the first eMIMO-type) may include 1 to 8 (i.e., K) NZP CSI-RS configuration and may be defined to calculate a BI or a CRI with respect to K NZP CSI-RSs configured as such, and the 'CSI-RS-ConfigBeamformed' for specifying the second CSI-RS configuration (i.e., the second eMIMO-type) may not include one NZP CSI-RS configuration (since one NZP CSI-RS configuration is already set to a UE as a default, it may be defined to apply it). Except this, the configuration methods of modified form that has the purpose may be existed.

In this case, an RRC parameter ('channelMeasRestriction') indicating activation/deactivation (ON/OFF) of a channel measurement restriction (MR) to each 'CSI-RS-ConfigBeamformed' for specifying each CSI-RS configuration may be independently configured to each of the first CSI-RS configuration (i.e., the first eMIMO-type) and the second CSI-RS configuration (i.e., the second eMIMO-type). Since this is for the purpose of reporting relatively long-term and/or wideband PMI (i.e., channel direction) information in the first CSI-RS configuration and the second CSI-RS configuration is for the purpose of reporting relatively short-term and/or narrowband CSI, the targets and the objects of the measurement/report are different. Accordingly, the independent configuration of channel MR ON/OFF function has an advantage that enables a flexible operation in accordance with various environments to be available. For example, since the first CSI-RS configuration is long-term, a measurement averaging in a UE is determined to be degrade a performance or MR-ON is set for the purpose of beamformed CSI-RS resource sharing. On the other hand, the second CSI-RS configuration may have a difference in a configuration owing to the configuration of MR-OFF, which is similar to the legacy operation. In addition, a noise suppression gain through a measurement averaging may be expected by setting MR-OFF even for the first CSI-RS configuration even in the case that it is relatively long-term. It may be implemented to obtain beamformed CSI-RS resource sharing effect in a short-term level by setting MR-ON for the second CSI-RS configuration.

Alternatively, an RRC parameter ('channelMeasRestriction') indicating activation/deactivation (ON/OFF) of a channel measurement restriction (MR) may be commonly configured in a specific CSI process in which the first CSI-RS configuration (i.e., the first eMIMO-type) and the second CSI-RS configuration (i.e., the second eMIMO-type) are configured together. Accordingly, by providing common MR ON/OFF when performing a channel measurement for the first CSI-RS configuration and the second CSI-RS configuration that have the associated purpose with each other. This has an advantage that simplifies a UE operation and complexity in the CSI calculation process in the single combined CSI process. That is, more simple UE implementation may be supported such that, when MR ON is set, an operation of measuring only a measurement sample for a single subframe always for all channel measurements with respect to the corresponding CSI process, and when MR OFF is set, a single operation process such as a particular moving averaging and a weighted averaging is consistently applied. For example, depending on whether an implementation of a corresponding eNB that transmits beamformed CSI-RS resources operates the beamformed CSI-RS resource sharing together with other UEs in the corresponding cell, MR-ON or MR-OFF may be selectively set generally in the hybrid CSI process, which has an advantage of removing a complexity of unnecessary signaling and supporting an easiness of implementation.

ii) Alternatively, the 'CSI-RS-ConfigBeamformed' for specifying the first CSI-RS configuration (i.e., the first eMIMO-type) may include 1 to 8 (i.e., K) NZP CSI-RS configurations (the fact that a particular one among them is applied as the second CSI-RS configuration is predefined or preconfigured according to one of them as described above), and as described above, it may be predefined or configured to a UE that one the them (e.g., the NZP CSI-RS configuration to which the lowest index 1 or the highest index 8 is given, or the NZP CSI-RS configuration set as a default) corresponds to the second CSI-RS configuration.

In this case, an RRC parameter ('channelMeasRestriction') indicating activation/deactivation (ON/OFF) of a channel measurement restriction (MR) may be commonly configured to each of the first CSI-RS configuration (i.e., the first eMIMO-type) and the second CSI-RS configuration (i.e., the second eMIMO-type) always.

iii) Alternatively, the second CSI-RS configuration may be defined that the NZP CSI-RS configuration configured to a UE as a default always is identical. In addition, the 'CSI-RS-ConfigBeamformed' for specifying the first CSI-RS configuration (i.e., the first eMIMO-type) may include 1 to 8 (i.e., K) NZP CSI-RS configurations.

The range of parameter K described above is just an example, but it is apparent that K value having greater range may be supported.

As such, the 'hybrid CSI' is configured, when a UE is served with CoMP operation, that is, the hybrid CSI may be more efficient such that a single CSI process is used for a single transmission point (TP) so as not to restrict the maximum number of TPs serving the UE.

In addition, the hybrid CSI is configured to a UE, and accordingly, there is an effect of decreasing uplink signaling overhead in comparison with the case that two CSI processes are individually configured to a UE.

For example, assuming that two CSI processes are individually configured to a UE and both of them are configured as Class B type CSI report, for example, the CSI-RS resource for the first CSI process may be configured as relatively long-term and the CSI-RS resource for the second CSI process may be configured as relatively short-term. In this case, according to the existing CSI reporting method, a UE reports RI/PMI/CQI for the CSI-RS resource indicated by a BI (or CRI) as well as the BI (or CRI) for the first CSI process to an eNB, and likewise, reports K=1 RI/PMI/CQI for the CSI-RS resource configured for the second CSI-RS process to an eNB. That is, in this case, a UE reports all of the BI (or CRI) and/or the RI/PMI/CQI for each CSI process set to the UE.

On the other hand, when the hybrid CSI is configured to a UE, according to the example described above, since the first CSI report type (i.e., the first eMIMO-type) is Class B CSI report based on K>1 CSI-RS resources, only a BI (or CRI) is reported (i.e., without CQI/PMI/RI). Since the second CSI report type (i.e., the second eMIMO-type) is Class B CSI report based on K=1 CSI-RS resource, only the CQI/PMI/RI may be reported (i.e., without BI (or CRI)). Accordingly, there is an effect of decreasing uplink signaling overhead in comparison with the case that two CSI processes are configured to a UE according to the existing CSI report method.

In addition, the hybrid CSI is configured to a UE, and accordingly, there is an effect that more CSI processes may be configured to a UE.

For example, in the case that the Carrier Aggregation (CA) is applied, the maximum number (e.g., 1, 3 and 4) of configurable CSI processes to a UE is restricted, and the maximum number (e.g., 20) of configurable CSI processes to a UE for the entire CCs is restricted. Accordingly, when the hybrid CSI is set to a UE, in comparison with the case that two CSI processes are set to a UE according to the existing CSI report method, the additional number of CSI processes may be configured for the corresponding UE.

Meanwhile, the method of utilizing two CSI processes described above means that the BI and the CSI report operation may be individually divided into two CSI processes.

In this case, a UE may report CSI as well as a BI (or CRI) to an eNB even for CSI process #1. In this case, it is reported the CSI calculated for the CSI-RS resource corresponding to the reported BI (or CRI) among the 4 long-term CSI-RSs 2 to 5.

That is, the CQI value among the reported CSI as such is compared with the CQI reported for short-term beamformed CSI-RS 1, and the CQI value may be utilized for identifying a degree of CQI improvement in advance in an eNB when a beam change is occurred by applying the newly reported BI (or CRI).

Alternatively, according to an eNB implementation, the CSI reported with a BI (or CRI) is ignored, and only the BI information may be utilized.

FIG. 13 is a diagram illustrating a method for transmitting and receiving channel state information according to an embodiment of the present invention.

Referring to FIG. 13, a UE receives configuration information for a single CSI process including a first CSI-RS configuration and a second CSI-RS configuration from an eNB (step, S1301).

That is, the single CSI process including the first CSI-RS configuration and the second CSI-RS configuration may correspond to the CSI process to which the hybrid CSI report type described above is configured.

For example, the first CSI-RS configuration may be the CSI-RS configuration associated with K (greater than 1) CSI-RS resources of the beamformed CSI-RS type (i.e., Class B) and the second CSI-RS configuration may be the CSI-RS configuration associated with a single CSI-RS resource of the beamformed CSI-RS type (i.e., Class B).

The K CSI-RS resources associated with the first CSI-RS configuration and the single CSI-RS resource associated with the second CSI-RS configuration may be independently configured.

Alternatively, among the K CSI-RS resources associated with the first CSI-RS configuration, a single CSI-RS resource associated with the second CSI-RS configuration may be configured. As described above, for example, among the K CSI-RS resources associated with the first CSI-RS configuration, a single CSI-RS resource associated with the second CSI-RS configuration may be determined to be the CSI-RS resource to which a lowest or a highest index is provided.

In addition, measurement restrictions may be separately applied to the first CSI-RS configuration and the second CSI-RS configuration, or a common (combined) measurement restriction may be applied to the first CSI-RS configuration and the second CSI-RS configuration.

The UE reports the indicator (i.e., BI or CRI) derived based on the first CSI-RS configuration to the eNB (step, S1302).

The UE reports CQI/PMI/RI derived based on the second CSI-RS configuration to the eNB (step, S1303).

Here, the UE may derive one or more of CQI, PMI and RI based on the second CSI-RS configuration and may report the derived one or more of CQI, PMI and RI to the eNB.

In addition, the CQI/PMI/RI may be independently calculated from the first CSI-RS configuration. That is, in calculating the CQI/PMI/RI, interdependence may not exist between the first CSI-RS configuration and the second CSI-RS configuration.

As described above, when the aperiodic CSI report is triggered, the indicator (i.e., BI or CRI) derived based on the first CSI-RS configuration and the CQI/PMI/RI derived based on the second CSI-RS configuration may be reported together to the eNB. That is, in this case, step S1302 and step S1303 may be performed together.

Alternatively, when the aperiodic CSI report is triggered, any one of the indicator (i.e., BI or CRI) derived based on the first CSI-RS configuration and the CQI/PMI/RI derived based on the second CSI-RS configuration may be reported to the eNB. In this case, the eNB may indicate an indication on which one is reported between the indicator (i.e., BI or CRI) derived based on the first CSI-RS configuration and the CQI/PMI/RI derived based on the second CSI-RS configuration.

As described above, in the case of the periodic CSI report, the indicator (i.e., BI or CRI) derived based on the first CSI-RS configuration may be reported on an indicator reporting instance, and the CQI/PMI/RI derived based on the second CSI-RS configuration may be reported on other instances than the indicator reporting instance.

Precoding Matrix Indicator (PMI) Definition

For transmission modes 4, 5 and 6, precoding feedback is used for channel dependent codebook based precoding, and dependent upon UE(s) reporting a PMI. In the case of transmission mode 8, a UE reports a PMI. In the case of transmission modes 9 and 10, a UE reports a PMI when PMI/RI report is configured and a CSI-RS port is greater than 1. The UE report a PMI based on a feedback mode. For other transmission modes, the PMI report is not supported.

For two antenna ports, each PMI value corresponds to a codebook index given by Table 10 below.

In the case that two antenna ports are $\{0, 1\}$ or $\{15, 16\}$ and the related RI value is 1, a PMI value ($n \in \{0, 1, 2, 3\}$) corresponds to codebook index n given by Table 10 below with respect to $\upsilon=1$.

In the case that two antenna ports are $\{0, 1\}$ or $\{15, 16\}$ and the related RI value is 2, a PMI value ($n \in \{0, 1\}$) corresponds to codebook index n+1 given by Table 10 below with respect to $\upsilon=2$.

Table 10 exemplifies a codebook for the CSI report based on antenna port $\{0, 1\}$ or $\{15, 16\}$ for a transmission on antenna port $\{0, 1\}$.

TABLE 10

| Codebook index | Number of layers ($\upsilon$) | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

In the case that four antenna ports are $\{0, 1, 2, 3\}$ or $\{15, 16, 17, 18\}$, as described below, each PMI value corresponds to the codebook index given by Table 11 below, or to a pair of the codebook indexes given by Table 12 to Table 15 below.

Except the case that a higher layer parameter 'alternativeCodeBookEnabledFor4TX-r12' is set to 'TRUE', a PMI value ($n \in \{0, 1, \ldots, 15\}$ corresponds to codebook index n given by Table 11 below with respect to the same υ as the related RI value.

In the case that a higher layer parameter 'alternativeCodeBookEnabledFor4TX-r12' is set to 'TRUE', each PMI value corresponds to a pair of the codebook indexes given by Table 12 to Table 15 below. In Table 12 and Table 13, $\varphi_n$, $\varphi_n'$ and $v_m'$ are represented as Equation 14 below.

$$\varphi_n = e^{j\pi n/2}$$

$$\varphi_n' = e^{j2\pi n/32}$$

$$v_m' = [1\ e^{j2\pi n/32}]^T \quad \text{[Equation 14]}$$

A first PMI value ($i_1 \in \{0, 1, \ldots, f(\upsilon)-1\}$) and a second PMI value ($i_2 \in \{0, 1, \ldots, g(\upsilon)-1\}$) correspond to codebook indexes $i_1$ and $i_2$, respectively, given by Table j with respect to the same υ as the related RI value. Here, when $\upsilon = \{1, 2, 3, 4\}$ $f(\upsilon) = \{16,16,1,1\}$ and $g(\upsilon) = \{16,16,16,16\}$, each of j corresponds to 12, 13, 14 and 15, respectively.

In Table 14 and Table 15, $W_n^{\{s\}}$ represents a matrix defined by columns given by set $\{s\}$ from formula $W_n = I - 2u_n u_n^H / u_n^H u_n$. Herein, I is a 4×4 unit matrix, and vector $u_n$ is determined by Table 11. Further, $n = i_2$.

Table 11 exemplifies a codebook for a transmission on antenna ports $\{1, 2, 3, 4\}$ and for a CSI report based on antenna ports $\{1, 2, 3, 4\}$ or $\{15, 16, 17, 18\}$.

Table 13 exemplifies a codebook for 2-layer CSI report using antenna ports 0 to 3 or 15 to 18.

TABLE 13

| $i_1$ | $i_2$ | | | |
|---|---|---|---|---|
|  | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ | | | |
|---|---|---|---|---|
|  | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ | | | |
|---|---|---|---|---|
|  | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ | | | |
|---|---|---|---|---|
|  | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE 11

| Codebook index | $u_n$ | Number of layers(v) | | | |
|---|---|---|---|---|---|
|  |  | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 12 exemplifies a codebook for 1-layer CSI report using antenna ports 0 to 3 or 15 to 18.

TABLE 12

| $i_1$ | $i_2$ | | | | | | | |
|---|---|---|---|---|---|---|---|---|
|  | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| $i_1$ | $i_2$ | | | | | | | |
|---|---|---|---|---|---|---|---|---|
|  | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ |

$$W_{m,n}^{(1)} = \frac{1}{2}\begin{bmatrix} v_m' \\ \varphi_n' v_m' \end{bmatrix}$$

TABLE 13-continued $$W^{(2)}_{m,m',n} = \frac{1}{\sqrt{8}} \begin{bmatrix} v'_m & v'_{m'} \\ \varphi_n v'_m & -\varphi_n v'_{m'} \end{bmatrix}$$

Table 14 exemplifies a codebook for 3-layer CSI report using antenna ports 15 to 18.

TABLE 14

| $i_1$ | \multicolumn{8}{c}{$i_2$} | | | | | | | |
|---|---|---|---|---|---|---|---|---|
|  | 0 | 1 | 2 | 3 | 4 | 5 | 6 | 7 |
| 0 | $W_0^{\{124\}}/\sqrt{3}$ | $W_1^{\{123\}}/\sqrt{3}$ | $W_2^{\{123\}}/\sqrt{3}$ | $W_3^{\{123\}}/\sqrt{3}$ | $W_4^{\{124\}}/\sqrt{3}$ | $W_5^{\{124\}}/\sqrt{3}$ | $W_6^{\{134\}}/\sqrt{3}$ | $W_7^{\{134\}}/\sqrt{3}$ |
| $i_1$ | \multicolumn{8}{c}{$i_2$} | | | | | | | |
|  | 8 | 9 | 10 | 11 | 12 | 13 | 14 | 15 |
| 0 | $W_8^{\{124\}}/\sqrt{3}$ | $W_9^{\{134\}}/\sqrt{3}$ | $W_{10}^{\{123\}}/\sqrt{3}$ | $W_{11}^{\{134\}}/\sqrt{3}$ | $W_{12}^{\{123\}}/\sqrt{3}$ | $W_{13}^{\{123\}}/\sqrt{3}$ | $W_{14}^{\{123\}}/\sqrt{3}$ | $W_{15}^{\{123\}}/\sqrt{3}$ |

Table 15 exemplifies a codebook for 4-layer CSI report using antenna ports 15 to 18.

TABLE 15

| $i_1$ | \multicolumn{8}{c}{$i_2$} | | | | | | | |
|---|---|---|---|---|---|---|---|---|
|  | 0 | 1 | 2 | 3 | 4 | 5 | 6 | 7 |
| 0 | $W_0^{\{1234\}}/2$ | $W_1^{\{1234\}}/2$ | $W_2^{\{3214\}}/2$ | $W_3^{\{3214\}}/2$ | $W_4^{\{1234\}}/2$ | $W_5^{\{1234\}}/2$ | $W_6^{\{1324\}}/2$ | $W_7^{\{1324\}}/2$ |
| $i_1$ | \multicolumn{8}{c}{$i_2$} | | | | | | | |
|  | 8 | 9 | 10 | 11 | 12 | 13 | 14 | 15 |
| 0 | $W_8^{\{1234\}}/2$ | $W_9^{\{1234\}}/2$ | $W_{10}^{\{1324\}}/2$ | $W_{11}^{\{1324\}}/2$ | $W_{12}^{\{1234\}}/2$ | $W_{13}^{\{1324\}}/2$ | $W_{14}^{\{3214\}}/2$ | $W_{15}^{\{1234\}}/2$ |

In the case of 8 antenna ports, each PMI value corresponds to a pair of codebook indexes given by Table 16 to Table 23 below. Herein, $\varphi_n$ and $v_m$ are as represented in Equation 15 below.

$\varphi_n = e^{j\pi n/2}$ $v_m = [1 \; e^{j2\pi m/32} \; e^{j4\pi m/32} \; e^{j6\pi m/32}]^T$ In the case of 8 antenna ports {15, 16, 17, 18, 19, 20, 21, 22}, a first PMI value ($i_1 \in \{0, 1, \ldots, f(\upsilon)-1\}$) and a second PMI value ($i_2 \in \{0, 1, \ldots, g(\upsilon)-1\}$) correspond to codebook indexes $i_1$ and $i_2$, respectively, given by Table j with respect to the same $\upsilon$ as the related RI value. Here, $j=\upsilon$, $f(\upsilon)=\{16, 16,4,4,4,4,4,1\}$ and, $g(\upsilon)=\{16,16,16,8,1,1,1,1\}$.

Table 16 exemplifies a codebook for 1-layer CSI report using antenna ports 15 to 22.

TABLE 16

| $i_1$ | \multicolumn{8}{c}{$i_2$} | | | | | | | |
|---|---|---|---|---|---|---|---|---|
|  | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| $i_1$ | \multicolumn{8}{c}{$i_2$} | | | | | | | |
|  | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

$$W^{(1)}_{m,n} = \frac{1}{\sqrt{8}} \begin{bmatrix} v_m \\ \varphi_n v_m \end{bmatrix}$$

Table 17 exemplifies a codebook for 2-layer CSI report using antenna ports 15 to 22.

TABLE 17

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1,0}^{(2)}$ | $W_{2i_1+1,2i_1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ |

$$W_{m,m',n}^{(2)} = \frac{1}{4}\begin{bmatrix} v_m & v_{m'} \\ \varphi_n v_m & -\varphi_n v_{m'} \end{bmatrix}$$

Table 18 exemplifies a codebook for 3-layer CSI report using antenna ports 15 to 22.

TABLE 18

| $i_1$ | $i_2$ | | | |
|---|---|---|---|---|
| | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| $i_1$ | $i_2$ | | | |
|---|---|---|---|---|
| | 4 | 5 | 6 | 7 |
| 0-3 | $W_{8i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| $i_1$ | $i_2$ | | | |
|---|---|---|---|---|
| | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | | |
|---|---|---|---|---|
| | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ |

$$W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix},$$

$$\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$$

Table 19 exemplifies a codebook for 4-layer CSI report using antenna ports 15 to 22.

TABLE 19

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ | | | |
|---|---|---|---|---|
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ |

$$W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

Table 20 exemplifies a codebook for 5-layer CSI report using antenna ports 15 to 22.

TABLE 20

| $i_1$ | $i_2$ |
|---|---|
| | 0 |
| 0-3 | $W_{i_1}^{(5)} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 21 exemplifies a codebook for 6-layer CSI report using antenna ports 15 to 22.

TABLE 21

| $i_1$ | $i_2$ |
|---|---|
|  | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 22 exemplifies a codebook for 7-layer CSI report using antenna ports 15 to 22.

TABLE 22

| $i_1$ | $i_2$ |
|---|---|
|  | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 23 exemplifies a codebook for 8-layer CSI report using antenna ports 15 to 22.

TABLE 23

| $i_1$ | $i_2$ |
|---|---|
|  | 0 |
| 0 | $W_{i_1}^{(8)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

In LTE-A, in order to improve an accuracy of a feedback channel, a precoding matrix indicator (PMI) of 8 transmitter (Tx) codebook is designed by being divided into W_1, long-term and/or wideband precoder and W_2, short-term and/or sub-band precoder.

The Equation for configuring a final PMI from two types of channel information is represented as a product of W_1 and W_2.

$$W = \text{norm}(W_1 W_2) \quad \text{[Equation 16]}$$

In Equation 16, W is a precoder generated from W_1 and W_2, and a UE feedbacks the information to an eNB. W_1 represents a long-term property of a channel and is fed back in wideband unit. W_2 represents a short-term property of a channel and performs a selection and co-phasing (in the case of cross polarized antenna), mainly.

norm(A) means a matrix in which norm for each column of matrix A is normalized into 1.

The overall structure of W_1 and W_2 in the 8Tx codebook defined in LTE is as represented in Equation 17 below.

$$W_1(i_1) = \begin{bmatrix} X_{i_1} & 0 \\ 0 & X_{i_1} \end{bmatrix}, \quad \text{[Equation 17]}$$

where $X_{i_1}$ is $Nt/2$ by $M$ matrix.

$$W_2(i_2) = \begin{bmatrix} \overbrace{e_M^k \quad e_M^l \quad \cdots \quad e_M^m}^{r\ columns} \\ \alpha_{i_2} e_M^k \quad \beta_{i_2} e_M^l \quad \gamma_{i_2} e_M^m \end{bmatrix} \quad (\text{if rank} = r),$$

where $l \leq k, l, m \leq M$ and $k, l, m$ are integer.

Herein, i_1 and i_2 are integers of 0 or more, and denote indexes of W_1 and W_2, respectively. Further, Nt denotes the number of transmission antennas. M denotes the number of columns in matrix $X_{i_1}$, and represents that there are total M candidate column vectors in matrix $X_{i_1}$.

$e_M^k$, $e_M^l$ and $e_M^m$ represent selection vectors of which length is M that only the values of $k^{th}$, $l^{th}$ and $m^{th}$ components are 1 and the remaining values are 0 among M components.

$\alpha_{i_2}$, $\beta_{i_2}$, and $\gamma_{i_2}$, are complex values having a unit norm, when selecting $k^{th}$, $l^{th}$ and $m^{th}$ column vectors of matrix $X_{i_1}$, each represents that a phase rotation is applied to the selected column vector.

Such a codeword structure is a structure designed by reflecting the correlation property of a generated channel, in the case that a cross polarized antenna is used and the interval between antennas is dense (e.g., in the case that a distance between antennas is a half of signal wavelength or less).

In the case of a cross polarized antenna, antennas may be divided into a horizontal antenna group and a vertical antenna group, and each antenna group may have a property of uniform linear array (ULA) antenna and two antenna groups may be co-located. Accordingly, the correlation between antenna groups has a property of the same linear phase increment (LPI), and the correlation between antenna groups has a property of phase rotation.

Since a codebook is a quantized value of a channel, it is required to design a codebook by reflecting the property of a channel that corresponds to a source without any change.

For the convenience of description, as an example of rank 1 codeword made by the structure, it may identified that such a channel property is reflected in the codeword that satisfies Equation 18.

$$W_1(i_1) * W_2(i_2) = \begin{bmatrix} X_{i_1}(k) \\ \alpha_{i_2} X_{i_1}(k) \end{bmatrix} \quad \text{[Equation 18]}$$

In Equation 18, a codeword is represented as a vector of N_t (the number of Tx antennas)×1, and is structured by a higher vector $X_{i_1}(k)$ and a lower vector $\alpha_{i_2} X_{i_1}(k)$. Each of them has a correlation property of a horizontal antenna group and a vertical antenna group. It is beneficial that $X_{i_1}(k)$ reflects a correlation property between antenna groups and is represented as a vector having the linear phase increment (LPI) property and a DFT matrix may be used as a representative example.

CSI-RS Configuration of Class B

As a form of Class B Alt. 2 described above, a CSI process based on Class B when K=1 may be defined.

Class B Alt-2:

i) A codebook may be used for representing co-phasing for a beam selection and different polarization antennas. For example, the codebook for a beam selection and co-phasing may be derived from the legacy codebook(s) (or component(s) of the legacy codebook) or a newly designed codebook.

In addition, an associated PMI may be reported. In this case, it may be assumed W=W2 in the newly designed codebook or the legacy codebook. That is, the PMI reported by a UE corresponds to a codebook index in the newly designed codebook or the legacy codebook, and may indicate precoder W2. In other words, W1 is not reported by a UE and only precoder W2 may be determined by the PMI reported by a UE.

ii) CSI may be reported according to UCI feedback mechanism on PUCCH/PUSCH.

The definition of CSI process configuration based on Class B may be defined/configured such that its meaning is changed when K>1 and K=1, respectively.

Here, the CSI process based on Class B when K>1 means the CSI process that the CSI process configuration configured in a CSI process is Class B type (i.e., the RRC parameter 'eMIMO-Type' of the corresponding CSI-RS configuration is set as 'beamformed') and to which more than one CSI-RS resources (K>1) are configured.

In this case, as described above, since 'CSI-Process' IE may include one 'csi-RS-ConfigNZPId' as a default, the CSI process to which more than one CSI-RS resources (K>1) are configured may mean that one or more NZP CSI-RS resources are configured in the CSI-RS configuration (i.e., 'CSI-RS-ConfigBeamformed' field) that corresponds to 'CLASS B' in the CSI process (i.e., 'csi-RS-ConfigNZPId-ListExt' which is a field for specifying one or more NZP CSI-RS resources is configured.).

In addition, the CSI process based on Class B when K=1 means the CSI process that the CSI process configuration configured in a CSI process is Class B type (i.e., the RRC parameter 'eMIMO-Type' of the corresponding CSI-RS configuration is set as 'beamformed') and to which one CSI-RS resource (K=1) is set.

In this case, as described above, since 'CSI-Process' IE may include one 'csi-RS-ConfigNZPId' as a default, the CSI process to which one CSI-RS resource (K=1) is configured may mean that NZP CSI-RS resource is not configured in the CSI-RS configuration (i.e., 'CSI-RS-ConfigBeamformed' field) that corresponds to 'CLASS B' in the CSI process (i.e., 'csi-RS-ConfigNZPIdListExt' which is a field for specifying one or more NZP CSI-RS resources is not set.).

Particularly, in the present invention, a method is proposed that the CSI process configuration (hereinafter, referred to K=1 CSI process configuration, simply) based on Class B when K=1 is defined as a plurality of types, and this is identified by an explicit signaling or an implicit signaling.

In other words, when K=1, two (or more) types of CSI process configurations may be defined. In this case, by a higher layer (e.g., RRC layer) configuration or dynamic indication (e.g., PDCCH), it may be indicated a type of the CSI process configurations set to a UE when K=1.

Accordingly, a UE may identify a type of the CSI process configurations by an explicit signaling (e.g., indication in configuration information of an RRC layer or PDCCH) like a specific indicator or an implicit indication when K=1, and may perform a reporting operation of the identified CSI.

For example, the K=1 CSI process configuration of a first type may correspond to the CSI process configuration based on Alt. 2 and the K=1 CSI process configuration of a second type may correspond to the CSI process configuration based on Alt. 4.

This is designed for supporting both of Alt. 2 and Alt. 4 when K=1 actually since the operation object of Alt. 2 and the operation object of Alt. 4 are different.

1) Case of K>1 (e.g., this case may correspond to Alt. 1) (or this case may also correspond to Alt. 3. In this case, the BI feedback operation below may be replaced by a specific predefined selection codebook operation.)

With respect to each of K beams (or CSI-RS resources), N_k value (N_k={1, 2, 4, 8}) may be configured as a single NZP CSI-RS resource. Alternatively, a common N_k value (N_k={1, 2, 4 or 8}) may be configured for all k's.

CSI report includes a BI (or CRI) feedback for selecting one among K beams (or CSI-RS resources).

CSI report for the selected beam (or CSI-RS resources) k=k'

The CSI report based on the legacy codebook for N_k' port may be performed.

2) Case of K=1 with type 1 (e.g., this case may correspond to Alt. 2)

N_1k value (N_1={1, 2, 4, 8}) may be configured as a single NZP CSI-RS resource.

Only W2 may be fed back for N_1 port. In addition, CSI may be reported based on the W2 feedback.

In this case, as described above, the codebook (newly designed) representing a beam selection and co-phasing for different polarization antennas may be used for W2 feedback.

In addition, as described above, the PMI reported by a UE may correspond to a codebook index in the newly designed codebook, and this may indicate W2. In other words, W1 is not reported by a UE, and only precoder W2 may be determined by the PMI reported by the UE.

3) Case of K=1 with type 2 (e.g., this case may correspond to Alt. 4)

N_1k value (N_1={1, 2, 4, 8}) may be configured as a single NZP CSI-RS resource.

For the CSI-RS resource which is configured, a measurement restriction (MR) may be always activated (always-on).

Both of W1 and W2 may be fed back for N1 port. That is, CSI may be reported based on W1 and W2 feedbacks using the legacy codebook (i.e., a codebook as represented in Table 10 to Table 23 above).

In this case, according to the configuration of N1 port CSI-RS resource and the corresponding feedback configuration, CSI may be reported based on the legacy codebook and the CSI feedback mechanism.

a) In this case, as an identification method of type 2 CSI process configuration when K=1, in the case that a single NZP CSI-RS resource is included in the Class B CSI process configuration as K=1, and in the case that MR-ON is indicated together with the corresponding CSI process configuration at the time, it may be defined or configured to a UE that a UE identify it as an operation according to type 2 CSI process configuration.

On the other hand, in the case of MR-OFF or in the case that additional configuration related to MR is not provided in the CSI process configuration, it may be defined or configured to a UE that a UE identify it as an operation according to type 1 CSI process configuration.

b) Alternatively, MR-ON/OFF may be indicated as stand-alone or configured wherever independently. That is, MR-ON/OFF may be configured even in the case of type 1 CSI process configuration. Likewise, MR is not always-on even in the type 2 CSI process configuration, and MR-ON/OFF may be configured.

In other words, it may be indicated whether to activate MR (ON/OFF) to both of type 1 CSI process configuration and type 2 CSI process configuration. Accordingly, a UE may not distinguish which type of CSI process configuration is configured depending on whether to activate MR.

Consequently, the CSI process configuration of type 1 and the CSI process configuration of type 2 may be distinguished by the index value fed back as a PMI, and by the codebook used for deriving CSI (i.e., PMI).

Particularly, according to the CSI process configuration of type 1, a feedback operation of only W2 is configured for N_1 port of a single CSI-RS resource, and for this, a newly designed codebook (i.e., a codebook as represented in Table 24 to Table 29 described below) assumed by W=W2 may be used.

On the other hand, according to the CSI process configuration of type 2, a feedback operation of both of W1 and W2 is configured for N_1 port of a single CSI-RS resource, and for this, the legacy codebook (i.e., a codebook as represented in Table 10 to Table 23 above) may be used.

In this case, as exemplified above, the CSI process configuration of type 1 may be explicitly indicated to a UE by a separate indicator such as the corresponding "type 1 CSI process configuration". As an example, it may be indicated which type of CSI process configuration is configured to a UE when K=1 on a higher layer (e.g., RRC layer) configuration or by a dynamic indication (e.g., PDCCH).

At this time, various forms and/or name may be provided to the indicator. For example, 'alternativeCodebookEnabledBeamformed' field may be defined and used as a field of an RRC layer. In this case, the 'alternativeCodebookEnabledBeamformed' field may indicate whether a newly defined codebook (i.e., a codebook as represented in Table 24 to Table 29) is used for deriving a CSI feedback or reporting a CSI process (in the case that the 'alternativeCodebookEnabledBeamformed' is TRUE, which indicates that the codebook is used.).

c) As another example, when there is another CSI process (e.g., Class A) configured to a corresponding UE, a method of implicit signaling may be used for indicating a type of CSI process when K=1 by being interlinked with specific information of the corresponding CSI process.

For example, it may be implicitly indicated by being interlinked with the number of CSI-RS ports and/or the port numbering in the CSI process of Class A.

d) As another identification method, in the case that a specific CSI process is configured as K+1 CSI-RS resources form as in the hybrid CSI described above, an identification method may be used that type 2 is applied for a specific (a single) CSI-RS resource (e.g., CSI-RS resource having a lowest index, etc.) and type 1 is always applied for the case that K=1 is configured for a specific CSI process.

That is, this case may have characteristics that K+1 CSI-RS resource should be always set in order to apply type 2 (e.g., Alt. 4) to a CSI process. In addition, simultaneously, since Alt. 2 operation may also be applied to the case that K=1 CSI-RS resource is set, there is an effect that all configurations/applications among Alt. 1 (and/or Alt. 3), Alt. 2 and Alt. 4, are available, consequently.

Hereinafter, a CSI reporting method according to a CSI process configuration is described in more detail as below.

In the case that the CSI-RS process (or CSI process configuration of beamformed CSI-RS type is configured and a single CSI process associated with a single CSI-RS resource) associated with a single CSI-RS resource of beamformed CSI-RS type (i.e., Class B) is configured, and the configured CSI process is the CSI process of type 1 according to the method described above, a UE may use a newly defined codebook (a codebook according to Table 24 to Table 29 below) for deriving and reporting CSI.

For example, in the case that 'eMIMO-Type' in the CSI process set to a UE is set as 'beamformed' (i.e., Class B) and an NZP CSI-RS configuration (i.e., resource) is set and a higher layer parameter 'alternativeCodebookEnabledBeamformed' is 'true', a PMI value may be determined as below.

For two antenna ports {15, 16}, the PMI value corresponds to codebook index n given by Table 24 below with respect to the same υ as the related RI value.

For four antenna ports {15, 16, 17, 18}, the PMI value corresponds to codebook index n given by Table 25 below with respect to the same υ as the related RI value.

For eight antenna ports {15, 16, 17, 18, 19, 20, 21, 22}, the PMI value corresponds to codebook index n given by Table 26 to Table 29 below with respect to the same υ as the related RI value.

In Table 24 to Table 29 below, $e_k^{(N)}$ denotes a column-vector of length N of which the first component as the same as k (i.e., k=1) is 1 (k,l∈{0, 1, . . . ,N−1}) and the remaining components are 0. This may be referred to as a selection vector.

Table 24 exemplifies a codebook for υ-layer CSI report using antenna ports {15, 16}.

TABLE 24

| Codebook | Number of layers (υ) | |
|---|---|---|
| index (n) | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |

Table 25 exemplifies a codebook for υ-layer CSI report using antenna ports {15, 16, 17, 18}.

TABLE 25

| Codebook index (n) | Number of layers (υ) | | | |
|---|---|---|---|---|
| | 1 | 2 | 3 | 4 |
| 0 | $\frac{1}{\sqrt{2}}\begin{bmatrix} e_0^{(2)} \\ e_0^{(2)} \end{bmatrix}$ | $\frac{1}{2}\begin{bmatrix} e_0^{(2)} & e_0^{(2)} \\ e_0^{(2)} & -e_0^{(2)} \end{bmatrix}$ | $\frac{1}{\sqrt{6}}\begin{bmatrix} e_0^{(2)} & e_0^{(2)} & e_1^{(2)} \\ e_0^{(2)} & -e_0^{(2)} & -e_1^{(2)} \end{bmatrix}$ | $\frac{1}{2\sqrt{2}}\begin{bmatrix} e_0^{(2)} & e_1^{(2)} & e_0^{(2)} & e_1^{(2)} \\ e_0^{(2)} & e_1^{(2)} & -e_0^{(2)} & -e_1^{(2)} \end{bmatrix}$ |
| 1 | $\frac{1}{\sqrt{2}}\begin{bmatrix} e_0^{(2)} \\ -e_0^{(2)} \end{bmatrix}$ | $\frac{1}{2}\begin{bmatrix} e_0^{(2)} & e_0^{(2)} \\ je_0^{(2)} & -je_0^{(2)} \end{bmatrix}$ | $\frac{1}{\sqrt{6}}\begin{bmatrix} e_1^{(2)} & e_0^{(2)} & e_1^{(2)} \\ e_1^{(2)} & -e_0^{(2)} & -e_1^{(2)} \end{bmatrix}$ | $\frac{1}{2\sqrt{2}}\begin{bmatrix} e_0^{(2)} & e_1^{(2)} & e_0^{(2)} & e_1^{(2)} \\ je_0^{(2)} & je_1^{(2)} & -je_0^{(2)} & -je_1^{(2)} \end{bmatrix}$ |
| 2 | $\frac{1}{\sqrt{2}}\begin{bmatrix} e_0^{(2)} \\ j \cdot e_0^{(2)} \end{bmatrix}$ | $\frac{1}{2}\begin{bmatrix} e_1^{(2)} & e_1^{(2)} \\ e_1^{(2)} & -e_1^{(2)} \end{bmatrix}$ | $\frac{1}{\sqrt{6}}\begin{bmatrix} e_0^{(2)} & e_1^{(2)} & e_1^{(2)} \\ e_0^{(2)} & e_1^{(2)} & -e_1^{(2)} \end{bmatrix}$ | — |
| 3 | $\frac{1}{\sqrt{2}}\begin{bmatrix} e_0^{(2)} \\ -j \cdot e_0^{(2)} \end{bmatrix}$ | $\frac{1}{2}\begin{bmatrix} e_1^{(2)} & e_1^{(2)} \\ je_1^{(2)} & -je_1^{(2)} \end{bmatrix}$ | $\frac{1}{\sqrt{6}}\begin{bmatrix} e_1^{(2)} & e_0^{(2)} & e_0^{(2)} \\ e_1^{(2)} & e_0^{(2)} & -e_0^{(2)} \end{bmatrix}$ | — |
| 4 | $\frac{1}{\sqrt{2}}\begin{bmatrix} e_1^{(2)} \\ e_1^{(2)} \end{bmatrix}$ | $\frac{1}{2}\begin{bmatrix} e_0^{(2)} & e_1^{(2)} \\ e_0^{(2)} & -e_1^{(2)} \end{bmatrix}$ | — | — |
| 5 | $\frac{1}{\sqrt{2}}\begin{bmatrix} e_1^{(2)} \\ -e_1^{(2)} \end{bmatrix}$ | $\frac{1}{2}\begin{bmatrix} e_0^{(2)} & e_1^{(2)} \\ je_0^{(2)} & -je_1^{(2)} \end{bmatrix}$ | — | — |
| 6 | $\frac{1}{\sqrt{2}}\begin{bmatrix} e_1^{(2)} \\ j \cdot e_1^{(2)} \end{bmatrix}$ | $\frac{1}{2}\begin{bmatrix} e_1^{(2)} & e_0^{(2)} \\ e_1^{(2)} & -e_0^{(2)} \end{bmatrix}$ | — | — |
| 7 | $\frac{1}{\sqrt{2}}\begin{bmatrix} e_1^{(2)} \\ -j \cdot e_1^{(2)} \end{bmatrix}$ | $\frac{1}{2}\begin{bmatrix} e_1^{(2)} & e_0^{(2)} \\ je_1^{(2)} & -je_0^{(2)} \end{bmatrix}$ | — | — |

Table 26 exemplifies a codebook (the case that the number (υ) of layers is 1, 2, 3 and 4) for υ-layer CSI report using antenna ports {15, 16, 17, 18, 19, 20, 21, 22}.

TABLE 26

| Codebook index (n) | Number of layers (υ) | | | |
|---|---|---|---|---|
| | 1 | 2 | 3 | 4 |
| 0 | $\frac{1}{\sqrt{2}}\begin{bmatrix} e_0^{(4)} \\ e_0^{(4)} \end{bmatrix}$ | $\frac{1}{2}\begin{bmatrix} e_0^{(4)} & e_0^{(4)} \\ e_0^{(4)} & -e_0^{(4)} \end{bmatrix}$ | $\frac{1}{\sqrt{6}}\begin{bmatrix} e_0^{(4)} & e_0^{(4)} & e_1^{(4)} \\ e_0^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ e_0^{(4)} & e_1^{(4)} & -e_0^{(4)} & -e_1^{(4)} \end{bmatrix}$ |
| 1 | $\frac{1}{\sqrt{2}}\begin{bmatrix} e_0^{(4)} \\ -e_0^{(4)} \end{bmatrix}$ | $\frac{1}{2}\begin{bmatrix} e_0^{(4)} & e_0^{(4)} \\ je_0^{(4)} & -je_0^{(4)} \end{bmatrix}$ | $\frac{1}{\sqrt{6}}\begin{bmatrix} e_1^{(4)} & e_0^{(4)} & e_1^{(4)} \\ e_1^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ je_0^{(4)} & je_1^{(4)} & -je_0^{(4)} & -je_1^{(4)} \end{bmatrix}$ |
| 2 | $\frac{1}{\sqrt{2}}\begin{bmatrix} e_0^{(4)} \\ j \cdot e_0^{(4)} \end{bmatrix}$ | $\frac{1}{2}\begin{bmatrix} e_1^{(4)} & e_1^{(4)} \\ e_1^{(4)} & -e_1^{(4)} \end{bmatrix}$ | $\frac{1}{\sqrt{6}}\begin{bmatrix} e_0^{(4)} & e_1^{(4)} & e_1^{(4)} \\ e_0^{(4)} & e_1^{(4)} & -e_1^{(4)} \end{bmatrix}$ | $\frac{1}{2\sqrt{2}}\begin{bmatrix} e_1^{(4)} & e_2^{(4)} & e_1^{(4)} & e_2^{(4)} \\ e_1^{(4)} & e_2^{(4)} & -e_1^{(4)} & -e_2^{(4)} \end{bmatrix}$ |
| 3 | $\frac{1}{\sqrt{2}}\begin{bmatrix} e_0^{(4)} \\ -j \cdot e_0^{(4)} \end{bmatrix}$ | $\frac{1}{2}\begin{bmatrix} e_1^{(4)} & e_1^{(4)} \\ je_1^{(4)} & -je_1^{(4)} \end{bmatrix}$ | $\frac{1}{\sqrt{6}}\begin{bmatrix} e_1^{(4)} & e_0^{(4)} & e_0^{(4)} \\ e_1^{(4)} & e_0^{(4)} & -e_0^{(4)} \end{bmatrix}$ | $\frac{1}{2\sqrt{2}}\begin{bmatrix} e_1^{(4)} & e_2^{(4)} & e_1^{(4)} & e_2^{(4)} \\ je_1^{(4)} & je_2^{(4)} & -je_1^{(4)} & -je_2^{(4)} \end{bmatrix}$ |
| 4 | $\frac{1}{\sqrt{2}}\begin{bmatrix} e_1^{(4)} \\ e_1^{(4)} \end{bmatrix}$ | $\frac{1}{2}\begin{bmatrix} e_2^{(4)} & e_2^{(4)} \\ e_2^{(4)} & -e_2^{(4)} \end{bmatrix}$ | $\frac{1}{\sqrt{6}}\begin{bmatrix} e_1^{(4)} & e_1^{(4)} & e_2^{(4)} \\ e_1^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ e_2^{(4)} & e_3^{(4)} & -e_2^{(4)} & -e_3^{(4)} \end{bmatrix}$ |
| 5 | $\frac{1}{\sqrt{2}}\begin{bmatrix} e_1^{(4)} \\ -e_1^{(4)} \end{bmatrix}$ | $\frac{1}{2}\begin{bmatrix} e_2^{(4)} & e_2^{(4)} \\ je_2^{(4)} & -je_2^{(4)} \end{bmatrix}$ | $\frac{1}{\sqrt{6}}\begin{bmatrix} e_2^{(4)} & e_1^{(4)} & e_2^{(4)} \\ e_2^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ je_2^{(4)} & je_3^{(4)} & -je_2^{(4)} & -je_3^{(4)} \end{bmatrix}$ |

TABLE 26-continued

| Codebook index (n) | Number of layers ($v$) | | | |
|---|---|---|---|---|
| | 1 | 2 | 3 | 4 |
| 6 | $\frac{1}{\sqrt{2}}\begin{bmatrix} e_1^{(4)} \\ j \cdot e_1^{(4)} \end{bmatrix}$ | $\frac{1}{2}\begin{bmatrix} e_3^{(4)} & e_3^{(4)} \\ e_3^{(4)} & -e_3^{(4)} \end{bmatrix}$ | $\frac{1}{\sqrt{6}}\begin{bmatrix} e_1^{(4)} & e_2^{(4)} & e_2^{(4)} \\ e_1^{(4)} & e_2^{(4)} & -e_2^{(4)} \end{bmatrix}$ | $\frac{1}{2\sqrt{2}}\begin{bmatrix} e_3^{(4)} & e_0^{(4)} & e_3^{(4)} & e_0^{(4)} \\ e_3^{(4)} & e_0^{(4)} & -e_0^{(4)} & -e_0^{(4)} \end{bmatrix}$ |
| 7 | $\frac{1}{\sqrt{2}}\begin{bmatrix} e_1^{(4)} \\ -j \cdot e_1^{(4)} \end{bmatrix}$ | $\frac{1}{2}\begin{bmatrix} e_3^{(4)} & e_3^{(4)} \\ je_3^{(4)} & -je_3^{(4)} \end{bmatrix}$ | $\frac{1}{\sqrt{6}}\begin{bmatrix} e_2^{(4)} & e_1^{(4)} & e_1^{(4)} \\ e_2^{(4)} & e_1^{(4)} & -e_1^{(4)} \end{bmatrix}$ | $\frac{1}{2\sqrt{2}}\begin{bmatrix} e_3^{(4)} & e_0^{(4)} & e_3^{(4)} & e_0^{(4)} \\ je_3^{(4)} & je_0^{(4)} & -je_0^{(4)} & -je_0^{(4)} \end{bmatrix}$ |
| 8 | $\frac{1}{\sqrt{2}}\begin{bmatrix} e_2^{(4)} \\ e_2^{(4)} \end{bmatrix}$ | $\frac{1}{2}\begin{bmatrix} e_0^{(4)} & e_1^{(4)} \\ e_0^{(4)} & -e_1^{(4)} \end{bmatrix}$ | $\frac{1}{\sqrt{6}}\begin{bmatrix} e_2^{(4)} & e_2^{(4)} & e_3^{(4)} \\ e_2^{(4)} & -e_2^{(4)} & -e_3^{(4)} \end{bmatrix}$ | — |
| 9 | $\frac{1}{\sqrt{2}}\begin{bmatrix} e_2^{(4)} \\ -e_2^{(4)} \end{bmatrix}$ | $\frac{1}{2}\begin{bmatrix} e_0^{(4)} & e_1^{(4)} \\ je_0^{(4)} & -je_1^{(4)} \end{bmatrix}$ | $\frac{1}{\sqrt{6}}\begin{bmatrix} e_3^{(4)} & e_2^{(4)} & e_3^{(4)} \\ e_3^{(4)} & -e_2^{(4)} & -e_3^{(4)} \end{bmatrix}$ | — |
| 10 | $\frac{1}{\sqrt{2}}\begin{bmatrix} e_2^{(4)} \\ j \cdot e_0^{(4)} \end{bmatrix}$ | $\frac{1}{2}\begin{bmatrix} e_1^{(4)} & e_2^{(4)} \\ e_1^{(4)} & -e_2^{(4)} \end{bmatrix}$ | $\frac{1}{\sqrt{6}}\begin{bmatrix} e_2^{(4)} & e_3^{(4)} & e_3^{(4)} \\ e_2^{(4)} & e_3^{(4)} & -e_3^{(4)} \end{bmatrix}$ | — |
| 11 | $\frac{1}{\sqrt{2}}\begin{bmatrix} e_2^{(4)} \\ -j \cdot e_2^{(4)} \end{bmatrix}$ | $\frac{1}{2}\begin{bmatrix} e_1^{(4)} & e_2^{(4)} \\ je_1^{(4)} & -je_2^{(4)} \end{bmatrix}$ | $\frac{1}{\sqrt{6}}\begin{bmatrix} e_3^{(4)} & e_2^{(4)} & e_2^{(4)} \\ e_3^{(4)} & e_2^{(4)} & -e_2^{(4)} \end{bmatrix}$ | — |
| 12 | $\frac{1}{\sqrt{2}}\begin{bmatrix} e_3^{(4)} \\ e_3^{(4)} \end{bmatrix}$ | $\frac{1}{2}\begin{bmatrix} e_0^{(4)} & e_3^{(4)} \\ e_0^{(4)} & -e_3^{(4)} \end{bmatrix}$ | $\frac{1}{\sqrt{6}}\begin{bmatrix} e_3^{(4)} & e_3^{(4)} & e_0^{(4)} \\ e_3^{(4)} & -e_3^{(4)} & -e_0^{(4)} \end{bmatrix}$ | — |
| 13 | $\frac{1}{\sqrt{2}}\begin{bmatrix} e_3^{(4)} \\ -e_3^{(4)} \end{bmatrix}$ | $\frac{1}{2}\begin{bmatrix} e_0^{(4)} & e_3^{(4)} \\ je_0^{(4)} & -je_3^{(4)} \end{bmatrix}$ | $\frac{1}{\sqrt{6}}\begin{bmatrix} e_0^{(4)} & e_3^{(4)} & e_0^{(4)} \\ e_0^{(4)} & -e_3^{(4)} & -e_0^{(4)} \end{bmatrix}$ | — |
| 14 | $\frac{1}{\sqrt{2}}\begin{bmatrix} e_3^{(4)} \\ j \cdot e_3^{(4)} \end{bmatrix}$ | $\frac{1}{2}\begin{bmatrix} e_1^{(4)} & e_3^{(4)} \\ e_1^{(4)} & -e_3^{(4)} \end{bmatrix}$ | $\frac{1}{\sqrt{6}}\begin{bmatrix} e_3^{(4)} & e_0^{(4)} & e_0^{(4)} \\ e_3^{(4)} & e_0^{(4)} & -e_0^{(4)} \end{bmatrix}$ | — |
| 15 | $\frac{1}{\sqrt{2}}\begin{bmatrix} e_3^{(4)} \\ -j \cdot e_3^{(4)} \end{bmatrix}$ | $\frac{1}{2}\begin{bmatrix} e_1^{(4)} & e_3^{(4)} \\ je_1^{(4)} & -je_3^{(4)} \end{bmatrix}$ | $\frac{1}{\sqrt{6}}\begin{bmatrix} e_0^{(4)} & e_3^{(4)} & e_3^{(4)} \\ e_0^{(4)} & e_3^{(4)} & -e_3^{(4)} \end{bmatrix}$ | — |

Table 27 exemplifies a codebook (the case that the number ($v$) of layers is 5 and 6) for $v$-layer CSI report using antenna ports {15, 16, 17, 18, 19, 20, 21, 22}.

TABLE 27

| Codebook index (n) | Number of layers ($v$) | |
|---|---|---|
| | 5 | 6 |
| 0 | $\frac{1}{\sqrt{10}}\begin{bmatrix} e_0^{(4)} & e_0^{(4)} & e_1^{(4)} & e_1^{(4)} & e_2^{(4)} \\ e_0^{(4)} & -e_0^{(4)} & e_1^{(4)} & -e_1^{(4)} & e_2^{(4)} \end{bmatrix}$ | $\frac{1}{2\sqrt{3}}\begin{bmatrix} e_0^{(4)} & e_0^{(4)} & e_1^{(4)} & e_1^{(4)} & e_2^{(4)} & e_2^{(4)} \\ e_0^{(4)} & -e_0^{(4)} & e_1^{(4)} & -e_1^{(4)} & e_2^{(4)} & -e_2^{(4)} \end{bmatrix}$ |
| 1-15 | — | — |

Table 28 exemplifies a codebook (the case that the number (υ) of layers is 7) for υ-layer CSI report using antenna ports {15, 16, 17, 18, 19, 20, 21, 22}.

TABLE 28

| Codebook index (n) | Number of layers (υ) 7 |
|---|---|
| 0 | $\frac{1}{\sqrt{14}} \begin{bmatrix} e_0^{(4)} & e_0^{(4)} & e_1^{(4)} & e_1^{(4)} & e_2^{(4)} & e_2^{(4)} & e_3^{(4)} \\ e_0^{(4)} & -e_0^{(4)} & e_1^{(4)} & -e_1^{(4)} & e_2^{(4)} & -e_2^{(4)} & e_3^{(4)} \end{bmatrix}$ |
| 1-15 | — |

Table 29 exemplifies a codebook (the case that the number (υ) of layers is 8) for υ-layer CSI report using antenna ports {15, 16, 17, 18, 19, 20, 21, 22}.

TABLE 29

| Codebook index (n) | Number of layers (υ) 8 |
|---|---|
| 0 | $\frac{1}{4} \begin{bmatrix} e_0^{(4)} & e_0^{(4)} & e_1^{(4)} & e_1^{(4)} & e_2^{(4)} & e_2^{(4)} & e_3^{(4)} & e_3^{(4)} \\ e_0^{(4)} & -e_0^{(4)} & e_1^{(4)} & -e_1^{(4)} & e_2^{(4)} & -e_2^{(4)} & e_3^{(4)} & -e_3^{(4)} \end{bmatrix}$ |
| 1-15 | — |

Referring to Table 24 to Table 29 (particularly, Table 25 to Table 29), a precoding matrix in a codebook may include only a beam selection vector and a factor for co-phasing between different polarized antennas.

In other words, the beam selection vector may correspond to $e_k^{(N)}$, and may indicate a selected beam based on the CSI-RS to which beamforming is applied by an eNB. Further, the factor for co-phasing may be determined to be one of 1, −1, j (a unit of imaginary number) and −j.

When it is indicated by the eNB that the codebook as represented in Table 24 to Table 29 (particularly, Table 25 to Table 29) is used, a UE may report an index for specifying a precoding matrix in the codebook to the eNB as a PMI. In other words, the beam selection vector constructing the corresponding precoding matrix and a single index for specifying the factor for co-phasing may be reported to the eNB as a PMI.

Meanwhile, in the case that the CSI-RS process (or CSI process configuration of beamformed CSI-RS type is set and a single CSI process associated with a single CSI-RS resource) associated with a single CSI-RS resource of beamformed CSI-RS type (i.e., Class B) is configured, and the configured CSI process is the CSI process of type 2 according to the method described above, a UE may use the legacy codebook (a codebook according to Table 10 to Table 23 above) for deriving and reporting CSI.

For example, except the case that 'eMIMO-Type' in the CSI process set to a UE is set as 'beamformed' (i.e., Class B) and an NZP CSI-RS configuration (i.e., resource) is set and a higher layer parameter 'alternativeCodebookEnabled-Beamformed' is 'true', a PMI value may correspond to the codebook index n or the codebook index pair given by Table 10 to Table 23 above.

Particularly, unless the fact that the codebook as represented in Table 24 to Table 29 is not indicated by an eNB, particularly, in the case that Table 12 to Table 23 are used, the index pair (i.e., a first index for specifying W1 and a second index for specifying W2) for specifying a precoding matrix in the corresponding codebook may be reported to an eNB as a PMI. In other words, a pair of the first index for specifying a set of precoding matrixes in a codebook and the second index for specifying a precoding matrix in a set of the precoding matrixes specified by the first index may be reported to an eNB as a PMI. That is, the beam selection vector constructing the precoding matrix in a set of the precoding matrixes and the factor for co-phasing may be specified by the second index.

FIG. 14 is a diagram illustrating a method for transmitting and receiving channel state information according to an embodiment of the present invention.

Referring to FIG. 14, a UE receives a CSI process configuration (i.e., 'CSI-process' RRC IE) from an eNB (step, S1301).

At this time, in the case that the CSI process configured by the CSI process configuration is configured as the beamformed CSI-RS type (i.e., Class B) and the CSI process is associated with a single CSI-RS resource, the CSI process configuration may be defined by various types as described above.

As described above, the CSI process configuration of type 1 in which a codebook (Table 24 to Table 29) is used for representing a beam selection and co-phasing for different polarized antennas for W2 feedback is used and the CSI process configuration in which in which both of W1 and W2 are activated from the legacy feedback (Table 10 to Table 23) are fed back and MR is activated may be defined.

At this time, as described above, it may be separately configured independently for each CSI process whether to activate MR (ON/OFF), and eventually, the type of the CSI process configuration may mean the codebook used for deriving the corresponding CSI process.

In this case, as the method described above, a type of the CSI process configurations may be indicated by an explicit signaling or an implicit signaling.

In other words, in the case that the CSI process configured by the CSI process configuration is configured as the beamformed CSI-RS type (i.e., Class B) and the CSI process is associated with a single CSI-RS resource, it may be indicated by the CSI process configuration which codebook is used for deriving a CSI that corresponds to the CSI process.

For example, the CSI process configuration may include indication information that indicates whether the first codebook is used for deriving the CSI and the first codebook may correspond to a newly designed codebook including a precoding matrix which is generated by a beam selection vector and a factor for co-phasing between different polarized antennas.

The UE reports the CSI that corresponds to the CSI process configured by the CSI process configuration to the eNB (step, S1302).

The UE may derive the CSI (e.g., at least one of CQI, PMI and RI) based on an NZP CSI-RS resource and/or a ZP CSI-RS resource, and may report the derived CSI to the eNB.

In this case, when it is indicated that the first codebook is used by the indication information (or by an implicit indication), a single index for specifying a precoding matrix in the first codebook may be reported to the eNB as a PMI.

On the contrary, in the case that it is not indicated that the first codebook is used by the indication information (or by an implicit indication), a pair of the first index for selecting a set of precoding matrixes from the second codebook (i.e., legacy codebook) and the second index for specifying a precoding matrix in a set of the precoding matrixes specified by the first index may be reported to an eNB as a PMI.

In summary, for the CSI process configuration of which 'eMIMO type' is Class B, in the case that a single NZP CSI-RS configuration is included in the configuration as K=1 in the corresponding CSI process configuration, it may be configured whether the UE feedbacks only the second PMI (W2) (i.e., type 1 CSI process configuration) using the codebook (i.e., newly designed the first codebook) constructed by the precoding matrix generated only by the beam selection and co-phasing that are newly designed or whether the UE feedbacks both of the first PMI (W1) and the second PMI (W2) by using the existing codebook (i.e., the second codebook).

As described above, in this case, 'alternativeCodebookEnabledBeamformed' RRC field may be configured in the corresponding CSI process configuration, and it is indicated which codebook is used by the UE for the CSI report (i.e., whether the first codebook is used).

Particularly, in the case that the 'alternativeCodebookEnabledBeamformed' field is 'TRUE', a newly designed codebook (i.e., the first codebook) may be used for deriving the CSI feedback (i.e., PMI). In this case, the first codebook may be constructed by the precoding matrix which is generated only by the selection vector for a beam selection and the factor for co-phasing between polarization antenna port groups. That is, the UE may derive only W2 in the new codebook and report it to the eNB.

On the other hand, in the case that the 'alternativeCodebookEnabledBeamformed' field is 'FALSE', the existing codebook (i.e., the second codebook) may be used for deriving the CSI feedback (i.e., PMI). That is, the UE may derive W1 and W2 in the existing codebook and report it to the eNB.

General Apparatus to which the Present Invention May be Applied

FIG. 15 illustrates a block diagram of a wireless communication apparatus according to an embodiment of the present invention.

Referring to FIG. 15, the wireless communication system includes a base station (eNB) 1510 and a plurality of user equipments (UEs) 1520 located within the region of the eNB 1510.

The eNB 1510 includes a processor 1511, a memory 1512 and a radio frequency unit 1513. The processor 1511 implements the functions, processes and/or methods proposed in FIGS. 1 to 14 above. The layers of wireless interface protocol may be implemented by the processor 1511. The memory 1512 is connected to the processor 1511, and stores various types of information for driving the processor 1511. The RF unit 1513 is connected to the processor 1511, and transmits and/or receives radio signals.

The UE 1520 includes a processor 1521, a memory 1522 and a radio frequency unit 1523. The processor 1521 implements the functions, processes and/or methods proposed in FIGS. 1 to 14 above. The layers of wireless interface protocol may be implemented by the processor 1521. The memory 1522 is connected to the processor 1521, and stores various types of information for driving the processor 1521. The RF unit 1523 is connected to the processor 1521, and transmits and/or receives radio signals.

The memories 1512 and 1522 may be located interior or exterior of the processors 1511 and 1521, and may be connected to the processors 1511 and 1521 with well known means. In addition, the eNB 1510 and/or the UE 1520 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example applied to the 3GPP LTE/LTE-A systems, but may be applied to various wireless communication systems in addition to the 3GPP LTE/LTE-A systems.

What is claimed is:

1. A method for transmitting channel state information (CSI) by a user equipment (UE) in a wireless communication system, the method comprising:
receiving, from a base station (B S), configuration information for a CSI process,
wherein based on that i) the CSI process is associated with a beamformed CSI-reference signal (CSI-RS) and ii) a single CSI-RS resource is configured for the CSI process, the configuration information includes information for indicating whether a codebook for a beam selection and co-phasing is configured to be used for deriving a CSI for the CSI process or not;
based on configurations that i) the CSI process is associated with the beamformed CSI-RS, ii) the single CSI-RS resource is configured for the CSI process and iii) the codebook for the beam selection and co-phasing is configured to be used for deriving the CSI based on the information, obtaining the CSI for the CSI process using the codebook for the beam selection and co-phasing; and transmitting, to the BS, the CSI for the CSI process.

2. The method of claim 1, wherein the CSI for the CSI process includes a single index for specifying a precoding matrix in the codebook as a Precoding Matrix Indicator (PMI), based on the codebook being configured to be used for deriving the CSI based on the information.

3. The method of claim 1, wherein the CSI for the CSI process includes a pair of a first index for selecting a set of precoding matrixes from another codebook and a second index for specifying a precoding matrix in the set of precoding matrixes specified by the first index as a Precoding Matrix Indicator (PMI), based on the codebook being configured not to be used for deriving the CSI based on the information.

4. The method of claim 1, wherein the codebook is not used for deriving the CSI, based on a CSI measurement restriction (MR) being configured to the CSI process.

5. The method of claim 1, wherein the codebook is used for deriving the CSI, based on a CSI measurement restriction (MR) being skipped to be configured to the CSI process.

6. The method of claim 1, wherein the configuration information includes measurement restriction (MR) indication information for whether a CSI MR is configured.

7. The method of claim 1, wherein, based on the CSI process including a first CSI-RS configuration associated with more than one CSI-RS resources of a beamformed CSI-RS type and a second CSI-RS configuration associated with one CSI-RS resource of the beamformed CSI-RS type,
the codebook is not used for a CSI-RS resource of the more than one CSI-RS resources configured in the first CSI-RS configuration, and the codebook is used for the one CSI-RS resource in the second CSI-RS configuration.

8. A user equipment (UE) transmitting channel state information (CSI) in a wireless communication system, the UE comprising:
a radio frequency (RF) unit for transmitting and receiving a radio signal; and
a processor for controlling the RF unit,
wherein the processor is configured to perform operations comprising:
receiving, from a base station (BS), configuration information for a CSI process,
wherein based on that i) the CSI process is associated with a beamformed CSI-reference signal (CSI-RS) and ii) a single CSI-RS resource is configured for the CSI process, the configuration information includes information for indicating whether a codebook for a beam selection and co-phasing is configured to be used for deriving a CSI for the CSI process or not;
based on configurations that i) the CSI process is associated with the beamformed CSI-RS, ii) the single CSI-RS resource is configured for the CSI process and iii) the codebook for the beam selection and co-phasing is configured to be used for deriving the CSI based on the information, obtaining the CSI for the CSI process using the codebook for the beam selection and co-phasing; and
transmitting, to the BS, the CSI for the CSI process.

9. The UE of claim 8, wherein a single index for specifying a precoding matrix in the codebook is reported to the BS as a Precoding Matrix Indicator (PMI), based on the codebook being configured to be used for deriving the CSI based on the information.

10. The UE of claim 8, wherein a pair of a first index for selecting a set of precoding matrixes from another codebook and a second index for specifying a precoding matrix in the set of precoding matrixes specified by the first index is reported to the BS as a Precoding Matrix Indicator (PMI), based on the codebook being configured not to be used for deriving the CSI based on the information.

* * * * *